United States Patent
Wang et al.

(10) Patent No.: US 10,208,232 B2
(45) Date of Patent: *Feb. 19, 2019

(54) ADHESIVE COMPOSITION

(71) Applicant: 3M INNOVATIVE PROPERTIES COMPANY, St. Paul, MN (US)

(72) Inventors: Shujun J. Wang, Woodbury, MN (US); Zhong Chen, Woodbury, MN (US); John R. Jacobsen, Woodbury, MN (US); Peggy S. Willett, Stillwater, MN (US); David J. Yarusso, Shoreview, MN (US); Soyoung Kim, San Jose, CA (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/888,949

(22) PCT Filed: May 6, 2014

(86) PCT No.: PCT/US2014/036892
§ 371 (c)(1),
(2) Date: Nov. 4, 2015

(87) PCT Pub. No.: WO2014/186169
PCT Pub. Date: Nov. 20, 2014

(65) Prior Publication Data
US 2016/0083629 A1 Mar. 24, 2016

Related U.S. Application Data

(60) Provisional application No. 61/822,989, filed on May 14, 2013.

(51) Int. Cl.
| | | |
|---|---|---|
| *C09J 133/08* | (2006.01) | |
| *C09J 133/10* | (2006.01) | |
| *C08F 265/06* | (2006.01) | |
| *C09J 151/00* | (2006.01) | |
| *C09J 7/38* | (2018.01) | |
| *C08L 33/08* | (2006.01) | |
| *C08L 33/10* | (2006.01) | |

(52) U.S. Cl.
CPC ........... *C09J 133/08* (2013.01); *C08F 265/06* (2013.01); *C08L 33/08* (2013.01); *C08L 33/10* (2013.01); *C09J 7/385* (2018.01); *C09J 133/10* (2013.01); *C09J 151/003* (2013.01); *C09J 2201/622* (2013.01); *C09J 2400/243* (2013.01); *C09J 2433/00* (2013.01)

(58) Field of Classification Search
CPC .... C09J 133/08; C09J 151/003; C09J 133/10; C09J 7/0217; C09J 2201/622; C09J 2433/00; C09J 400/243; C08F 265/06; C08L 33/08

See application file for complete search history.

(56) References Cited

U.S. PATENT DOCUMENTS

| | | |
|---|---|---|
| 3,691,140 A | 9/1972 | Silver |
| 4,045,517 A | 8/1977 | Guerin |
| 4,166,152 A | 8/1979 | Baker |
| 4,503,169 A | 3/1985 | Randklev |
| 4,619,979 A | 10/1986 | Kotnour |
| 4,636,432 A | 1/1987 | Shibano |
| 4,656,218 A | 4/1987 | Kinoshita |
| 4,737,559 A | 4/1988 | Kellen |
| 4,762,888 A * | 8/1988 | Sun ................. A61L 15/585 525/125 |
| 4,843,134 A | 6/1989 | Kotnour |
| 4,879,178 A * | 11/1989 | Sun ................. A61L 15/585 428/355 AC |
| 5,045,569 A | 9/1991 | Delgado |
| 5,602,221 A | 2/1997 | Bennett |
| 5,637,646 A | 6/1997 | Ellis |
| 5,804,610 A | 9/1998 | Hamer |
| 6,103,152 A | 8/2000 | Gehlsen |
| 6,783,850 B2 | 8/2004 | Takizawa |
| 6,797,371 B1 | 9/2004 | Gehlsen |
| 6,939,911 B2 | 9/2005 | Tosaki |
| 7,090,721 B2 | 8/2006 | Craig |
| 7,090,722 B2 | 8/2006 | Budd |
| 7,156,911 B2 | 1/2007 | Kangas |

(Continued)

FOREIGN PATENT DOCUMENTS

| | | |
|---|---|---|
| JP | 52-108459 | 9/1977 |
| JP | 2001-131250 | 5/2001 |

(Continued)

OTHER PUBLICATIONS

Pocius, Adhesion and Adhesives Technology, 2002, 8 pages.
Fox, "The Spreading of Liquids on Low Energy Surface. I. Polytetrafluoroethylene," Journal of Colloid Science, Dec. 1950, vol. 5, No. 6, pp. 514-531.
James, Physical properties of Polymers Handbook, Chapter 59, pp. 1011-1019.
Rauwendaal, "Mixing in Single-Screw Extruders," Mixing in Polymer Processing, 1991, pp. 129-240.
Zisman, "Relation of Equilibrium Contact Angle to Liquid and Solid Constitution," American Chemical Society, 1964, Chapter 1, In Contact Angle, Wettability, and Adhesion, pp. 1-51.
International Search report for PCT International Application No. PCT/US2014/036892 dated Jul. 2, 2014, 3 pages.

(Continued)

*Primary Examiner* — Jessica M Roswell
(74) *Attorney, Agent, or Firm* — Kent S. Kokko

(57) ABSTRACT

Disclosed is a crosslinked adhesive composition comprising a low $T_g$ (meth)acrylate copolymer component, a high $T_g$ (meth)acrylate copolymer component, and a hydrogenated hydrocarbon tackifier. This disclosure provides a pressure-sensitive adhesive and pressure-sensitive adhesive articles that are particularly useful in the bonding of low surface energy (LSE) substrates.

5 Claims, No Drawings

(56) References Cited

U.S. PATENT DOCUMENTS

| | | |
|---|---|---|
| 7,649,029 B2 | 1/2010 | Kolb |
| 7,879,441 B2 | 2/2011 | Gehlsen |
| 8,137,807 B2 | 3/2012 | Clapper |
| 9,290,682 B2 * | 3/2016 | Chen .................. C09J 133/08 |
| 2008/0281047 A1 | 11/2008 | Kishioka |
| 2010/0136321 A1 | 6/2010 | Uesugi |
| 2010/0323197 A1 | 12/2010 | Maeda |
| 2011/0070434 A1 | 3/2011 | Hirose |

FOREIGN PATENT DOCUMENTS

| | | |
|---|---|---|
| JP | 2003-29210 | 10/2003 |
| WO | WO 1996-07522 | 3/1996 |
| WO | WO 2004/094549 | 11/2004 |
| WO | WO 2005/026283 | 3/2005 |
| WO | WO 2010-002557 | 1/2010 |
| WO | WO 2012-044529 | 4/2012 |
| WO | WO 2013-074446 | 5/2013 |

* cited by examiner

ADHESIVE COMPOSITION

CROSS REFERENCE TO RELATED APPLICATIONS

This application is a national stage filing under 35 U.S.C. 371 of PCT/US2014/036892, filed May 6, 2014, which claims priority to U.S. Application No. 61/822,989, filed May 14, 2013, the disclosure of which is incorporated by reference in its/their entirety herein.

TECHNICAL FIELD OF THE INVENTION

This invention relates to melt-processable adhesives and tape articles prepared therefrom. The adhesives are characterized by exhibiting an overall balance of adhesive and cohesive characteristics and exceptional adhesion to low surface energy substrates.

BACKGROUND OF THE INVENTION

Pressure-sensitive tapes are virtually ubiquitous in the home and workplace. In its simplest configuration, a pressure-sensitive tape comprises an adhesive and a backing, and the overall construction is tacky at the use temperature and adheres to a variety of substrates using only moderate pressure to form the bond. In this fashion, pressure-sensitive tapes constitute a complete, self-contained bonding system.

According to the Pressure-Sensitive Tape Council, pressure-sensitive adhesives (PSAs) are known to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). PSAs do not embrace compositions merely because they are sticky or adhere to a surface.

These requirements are assessed generally by means of tests which are designed to individually measure tack, adhesion (peel strength), and cohesion (shear holding power), as noted in A. V. Pocius in Adhesion and Adhesives Technology: An Introduction, $2^{nd}$ Ed., Hanser Gardner Publication, Cincinnati, Ohio, 2002. These measurements taken together constitute the balance of properties often used to characterize a PSA.

SUMMARY

The present disclosure provides an adhesive composition comprising a low glass transition temperature ($T_g$) (meth) acrylate copolymer component, a high $T_g$ (meth)acrylate copolymer component, and preferably a hydrogenated hydrocarbon tackifier. The two copolymers may be cross-linked by electron beam. This disclosure provides a pressure-sensitive adhesive, and pressure-sensitive adhesive articles that are particularly useful in the bonding of low surface energy (LSE) substrates, and exhibit high peel values, particularly at elevated temperatures.

This disclosure further provides a method of preparing a melt-processable adhesive comprising combing a high $T_g$ (meth)acrylate copolymer component, a low $T_g$ (meth)acrylate copolymer, a hydrogenated hydrocarbon tackifier, melt extruding the mixture, and e-beam crosslinking the extruded mixture.

In a preferred embodiment, this disclosure further provides a method of preparing a melt-processable adhesive comprising combing a high $T_g$ (meth)acrylate copolymer component, a monomer mixture for a low $T_g$ copolymer, polymerizing the mixture, melt extruding the polymerized mixture, and e-beam crosslinking the extruded mixture.

The high $T_g$ (meth)acrylate copolymer has a $M_w \geq 30$ kDaltons, preferably a $M_w \leq 75$ kD, a $T_g$ of $\geq 50°$ C., and comprises:

i) high $T_g$ (meth)acrylic acid ester monomer units;
ii) optional, but preferably, acid functional ethylenically unsaturated monomer units;
iii) optional low $T_g$ (meth)acrylic acid ester monomer units;
iv) optional non-acid functional, ethylenically unsaturated polar monomer units;
v) optional vinyl monomer units, wherein the sum of i) to v) is 100 parts.

The monomer mixture for the low $T_g$ acrylate copolymer component comprises:

i. low $T_g$ (meth)acrylic acid ester monomer units;
ii. optional acid-functional ethylenically unsaturated monomer units;
iii. optional non-acid functional, ethylenically, unsaturated polar monomer units;
iv. optional vinyl monomer units; wherein the sum of i) to iv) is 100 parts; and the monomer mixture, when polymerized, yields a (meth)acrylate copolymer having a $T_g$ of $\leq 20°$ C., a $M_w \geq 100$ kD, preferably a $M_w \leq 1000$ kD.

In one embodiment, the non-acid functional, ethylenically unsaturated polar monomer units are base-functional polar monomers, the low $T_g$ monomer mixture comprises base-functional polar monomer units ("polar monomers"), and the high $T_g$ copolymer contains no base-functional polar monomers. In another embodiment, the low $T_g$ monomer mixture has no base-functional polar monomers, and the high $T_g$ copolymer has base-functional polar monomers. Preferred base-functional polar monomers are those that will undergo an acid-base interaction with the acid-functional monomers or monomer units of the other copolymer component. Particularly preferred polar monomer are amine-functional and acrylamide monomers.

In some preferred embodiments, the low $T_g$ (meth)acrylate copolymer component comprises an acid-functional co-monomer and the high $T_g$ (meth)acrylate copolymer component comprises a base-functional co-monomer. In other preferred embodiments, the high $T_g$ (meth)acrylate copolymer component comprises an acid-functional co-monomer and the low $T_g$ (meth)acrylate copolymer component comprises a base-functional co-monomer.

The pressure-sensitive adhesives of this disclosure provide the desired balance of tack, peel adhesion, and shear holding power, and further conform to the Dahlquist criteria; i.e. the modulus of the adhesive at the application temperature, typically room temperature, is less than $3 \times 10^5$ Pascal at a frequency of 1 Hz. The adhesives of the present disclosure are particularly useful for forming strong bonds to low surface energy (LSE) substrates, and further exhibit exceptional adhesion at elevated temperatures on these substrates.

As used herein, "alkyl" includes straight-chained, branched, and cyclic alkyl groups and includes both unsubstituted and substituted alkyl groups. Unless otherwise indicated, the alkyl groups generally contain from 1 to 18 carbon atoms. Examples of "alkyl" as used herein include, but are not limited to, methyl, ethyl, n-propyl, n-butyl, n-pentyl, isobutyl, t-butyl, isopropyl, n-octyl, 2-octyl, n-heptyl, ethylhexyl, cyclopentyl, cyclohexyl, cycloheptyl, adamantyl, and norbornyl, and the like. Unless otherwise noted, alkyl groups may be mono- or polyvalent.

Adhesion to low surface energy materials is a long-felt need in the art of acrylic adhesive formulation. While there are adhesives that provide acceptable levels of performance, there is an ongoing need for more options to meet this demand. Furthermore, a pressure sensitive adhesive is typically formulated for adhesion properties at or near room temperature.

When a usage temperature exceeds its $T_g$, the adhesion of a typical acrylic adhesive drops rapidly. Therefore, there is also a need for acrylic adhesive compositions that can maintain sufficient adhesion even at elevated temperatures ($\geq 100°$ C.) for many demanding applications, for examples in the electronic, automotive, and industrial markets. The present inventors have discovered that by blending high $T_g$ acrylic copolymers into a low $T_g$ copolymer matrix to form a weakly separating phase morphology, surprising improvements in overall adhesion to LSE substrates, especially at elevated temperatures, were achieved.

DETAILED DESCRIPTION

This disclosure provides a crosslinked adhesive, preferably electron-beam crosslinked, composition comprising:
a) a high $T_g$ copolymer having a Mw$\geq$30 kD comprising:
  i. high $T_g$ (meth)acrylic acid ester monomer units;
  ii) optional acid functional ethylenically unsaturated monomer units;
  iii) optional low $T_g$ (meth)acrylic acid ester monomer units;
  iv) optional non-acid functional, ethylenically unsaturated polar monomer units;
  v) optional vinyl monomer units; wherein the sum of i) to v) is 100 parts
b) a low $T_g$ copolymer comprising
  i. low $T_g$ (meth)acrylic acid ester monomers;
  ii. optional acid functional ethylenically unsaturated monomers;
  iii. optional non-acid functional, ethylenically unsaturated polar monomers;
  iv. optionally vinyl monomers; wherein the sum of i) to iv) is 100 parts and
c) a hydrogenated hydrocarbon tackifier.

For both of the high and low $T_g$ copolymers, a useful predictor of interpolymer $T_g$ for specific combinations of various monomers can be computed by application of Fox Equation: $1/T_g = \Sigma W_i/T_g i$. In this equation, $T_g$ is the glass transition temperature of the mixture, Wi is the weight fraction of component i in the mixture, and $T_g i$ is the glass transition temperature of component i, and all glass transition temperatures are calculated in Kelvin (K). As used herein the term "high $T_g$ monomer" refers to a monomer, which when homopolymerized, produce a (meth)acrylate copolymer having a $T_g$ of $\geq 50°$ C. The incorporation of the high $T_g$ monomer to the high $T_g$ copolymer is sufficient to raise the glass transition temperature of the resulting copolymer to $\geq 50°$ C., preferably $\geq 75°$ C., as calculated using the Fox Equation. Alternatively, the glass transition temperature can be measured in a variety of known ways, including, e.g., through differential scanning calorimetry (DSC).

The adhesive compositions of this disclosure comprise, in part, a high $T_g$ (co)polymer component, having $M_w \geq 30$ kD, and less than 100 kD, preferably less than 75 kD. The high $T_g$ (co)polymer has a $T_g \geq 50°$ C., preferably $\geq 75°$ C., as measured by the Fox Equation, or by DSC. The high $T_g$ copolymer comprises:
  i) high $T_g$ (meth)acrylic acid ester monomer units;
  ii) optional acid functional ethylenically unsaturated monomer units;
  iii) optional low $T_g$ (meth)acrylic acid ester monomer units;
  iv) optional non-acid functional, ethylenically unsaturated polar monomer units; and
  v) optional vinyl monomer units, wherein the sum of i) to v) is 100 parts.

The high $T_g$ copolymer may comprise 100 wt. % high $T_g$ monomer(s). In other embodiments, the high $T_g$ copolymer may comprise the additional monomer units, as described for the low $T_g$ copolymer (supra), each in amounts such that the $T_g$ of the resulting copolymer is at least 50° C., preferably at least 75° C., as estimated by the Fox equation.

Thus the high $T_g$ copolymer may comprise:
  i) up to 100 parts by weight of high $T_g$ (meth)acrylic acid ester monomer units;
  ii) 0 to 15, preferably 1 to 10 parts by weight of acid functional ethylenically unsaturated monomer units;
  iii) 0 to 50, preferably 1 to 25 parts by weight of optional low $T_g$ (meth)acrylic acid ester monomer units;
  iv) 0 to 15, preferably 1 to 10 parts by weight of optional a non-acid functional, ethylenically unsaturated polar monomer units; and
  v) 0 to 5, preferably 1 to 5 parts by weight of optional vinyl monomer units, wherein the sum of i) to v) is 100 parts.

It is desirable for the (meth)acrylic acid ester (co)polymer to include a high $T_g$ monomer units, such that the high $T_g$ copolymer has a $T_g$ of $\geq 50°$ C., and preferably $\geq 75°$ C., as estimated by the Fox Equation or by DSC.

Suitable high $T_g$ monomers include, but are not limited to, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, benzyl methacrylate, 3,3,5 trimethylcyclohexyl acrylate, cyclohexyl acrylate, N-octyl acrylamide, and propyl methacrylate or combinations.

Suitable low $T_g$ monomers include have one ethylenically unsaturated group and a glass transition temperature of less than 0° C. (as a function of the homopolymer), which are suitable in the present invention include, for example, n-butyl acrylate, isobutyl acrylate, hexyl acrylate, 2-ethyl-hexylacrylate, isooctylacrylate, caprolactoneacrylate, isodecylacrylate, tridecylacrylate, laurylmethacrylate, methoxypolyethylenglycol-monomethacrylate, laurylacrylate, tetrahydrofurfuryl-acrylate, ethoxy-ethoxyethyl acrylate and ethoxylated-nonylacrylate. Especially preferred are 2-ethylhexylacrylate, ethoxy-ethoxyethyl acrylate, tridecylacrylate and ethoxylated nonylacrylate.

Other monomers may be used as described for the low $T_g$ copolymer (below).

The high $T_g$ (co)polymers herein may be prepared by any conventional free radical polymerization method, including solution, radiation, bulk, dispersion, emulsion, and suspension processes. The resulting adhesive (co)polymers may be random or block (co)polymers.

The adhesive copolymers may be prepared via suspension polymerizations as disclosed in U.S. Pat. No. 3,691,140 (Silver); U.S. Pat. No. 4,166,152 (Baker et al.); U.S. Pat. No.

4,636,432 (Shibano et al); U.S. Pat. No. 4,656,218 (Kinoshita); and U.S. Pat. No. 5,045,569 (Delgado).

Polymerization via emulsion techniques may require the presence of an emulsifier (which may also be called an emulsifying agent or a surfactant). Useful emulsifiers for the present invention include those selected from the group consisting of anionic surfactants, cationic surfactants, non-ionic surfactants, and mixtures thereof. Preferably, an emulsion polymerization is carried out in the presence of anionic surfactant(s). A useful range of surfactant concentration is from about 0.5 to about 8 weight percent, preferably from about 1 to about 5 weight percent, based on the total weight of all monomers of the emulsion pressure-sensitive adhesive.

Alternatively, the copolymers can be polymerized by techniques including, but not limited to, the conventional techniques of solvent polymerization, dispersion polymerization, and solventless bulk polymerization. The monomer mixture may comprise a polymerization initiator, especially a thermal initiator or a photoinitiator of a type and in an amount effective to polymerize the co-monomers.

A typical solution polymerization method is carried out by adding the monomers, a suitable solvent, and an optional chain transfer agent to a reaction vessel, adding a free radical initiator, purging with nitrogen, and maintaining the reaction vessel at an elevated temperature, typically in the range of about 40 to 100° C. until the reaction is completed, typically in about 1 to 20 hours, depending upon the batch size and temperature. Examples of the solvent are methanol, tetrahydrofuran, ethanol, isopropanol, acetone, methyl ethyl ketone, methyl acetate, ethyl acetate, toluene, xylene, and an ethylene glycol alkyl ether. Those solvents can be used alone or as mixtures thereof.

Water-soluble and oil-soluble initiators useful in preparing the high $T_g$ (co)polymers used in the present invention are initiators that, on exposure to heat, generate free-radicals which initiate (co)polymerization of the monomer mixture. Water-soluble initiators are preferred for preparing the (meth)acrylate polymers by emulsion polymerization. Suitable water-soluble initiators include but are not limited to those selected from the group consisting of potassium persulfate, ammonium persulfate, sodium persulfate, and mixtures thereof; oxidation-reduction initiators such as the reaction product of the above-mentioned persulfates and reducing agents such as those selected from the group consisting of sodium metabisulfite and sodium bisulfite; and 4,4'-azobis(4-cyanopentanoic acid) and its soluble salts (e.g., sodium, potassium). The preferred water-soluble initiator is potassium persulfate. Suitable oil-soluble initiators include but are not limited to those selected from the group consisting of azo compounds such as VAZO™ 64 (2,2'-azobis(isobutyronitrile)) and VAZO™ 52 (2,2'-azobis(2,4-dimethylpentanenitrile)), both available from E.I. du Pont de Nemours Co., peroxides such as benzoyl peroxide and lauroyl peroxide, and mixtures thereof. The preferred oil-soluble thermal initiator is (2,2'-azobis(isobutyronitrile)). When used, initiators may comprise from about 0.05 to about 1 part by weight, preferably about 0.1 to about 0.5 part by weight based on 100 parts by weight of monomer components in the pressure-sensitive adhesive.

In a typical photopolymerization method, a monomer mixture may be irradiated with ultraviolet (UV) rays in the presence of a photopolymerization initiator (i.e., photoinitiators). Useful photoinitiators include benzoin ethers such as benzoin methyl ether and benzoin isopropyl ether; substituted acetophenones such as 2,2-dimethoxyacetophenone, available as Irgacure™ 651 photoinitiator (BASF, Ludwigshafen, Germany), 2,2 dimethoxy-2-phenyl-1-phenylethanone, available as Esacure™ KB-1 photoinitiator (Sartomer Co.; West Chester, Pa.), and dimethoxyhydroxyacetophenone; substituted α-ketols such as 2-methyl-2-hydroxy propiophenone; aromatic sulfonyl chlorides such as 2-naphthalene-sulfonyl chloride; and photoactive oximes such as 1-phenyl-1,2-propanedione-2-(O-ethoxy-carbonyl)oxime. Particularly preferred among these are the substituted acetophenones.

Preferred photoinitiators are photoactive compounds that undergo a Norrish I cleavage to generate free radicals that can initiate by addition to the acrylic double bonds. Additional photoinitiator can be added to the mixture to be coated after the copolymer has been formed.

The polymerizable composition and the photoinitiator may be irradiated with activating UV radiation to polymerize the monomer component(s). UV light sources can be of two types: 1) relatively low light intensity sources such as backlights which provide generally 10 mW/cm$^2$ or less (as measured in accordance with procedures approved by the United States National Institute of Standards and Technology as, for example, with a Uvimap™ UM 365 L-S radiometer manufactured by Electronic Instrumentation & Technology, Inc., in Sterling, Va.) over a wavelength range of 280 to 400 nanometers and 2) relatively high light intensity sources such as medium pressure mercury lamps which provide intensities generally greater than 10 mW/cm$^2$, preferably between 15 and 450 mW/cm$^2$. For example, an intensity of 600 mW/cm$^2$ and an exposure time of about 1 second may be used successfully. Intensities can range from about 0.1 to about 150 mW/cm$^2$, preferably from about 0.5 to about 100 mW/cm$^2$, and more preferably from about 0.5 to about 50 mW/cm$^2$. Such photoinitiators preferably are present in an amount of from 0.1 to 1.0 pbw per 100 pbw of the polymer composition.

The degree of conversion (of monomers to copolymer) can be monitored during the irradiation by measuring the index of refraction of the polymerizing mixture.

Solventless polymerization methods, such as the continuous free radical polymerization method described in U.S. Pat. Nos. 4,619,979 and 4,843,134 (Kotnour et al.); the essentially adiabatic polymerization methods using a batch reactor described in U.S. Pat. No. 5,637,646 (Ellis); and, the methods described for polymerizing packaged pre-adhesive compositions described in U.S. Pat. No. 5,804,610 (Hamer et al.) may also be utilized to prepare the polymers. Preferably, the high $T_g$ copolymer is prepared by the adiabatic batch polymerization process wherein the total of the absolute value of any energy exchanged to or from the batch during the course of reaction will be less than about 15% of the total energy liberated due to reaction for the corresponding amount of polymerization that has occurred during the time that polymerization has occurred, as described in U.S. Pat. No. 5,637,646 (Ellis), incorporated herein by reference.

It will be understood that the polymerization method to produce the high $T_g$ copolymer will produce a "dead polymer" in the initial free radical polymerization; i.e. a fully polymerized, not free-radically polymerizable polymer. Subsequently the monomer mixture for the low $T_g$ copolymers do not free-radically polymerize onto the extant high $T_g$ copolymer, although the two copolymers may be subsequently crosslinked.

The compositions of this disclosure comprise, in part, a low $T_g$ copolymer component or a monomer mixture for a low $T_g$ copolymer component. When polymerized, the $T_g$ of the copolymer is ≤20° C. as estimated by the Fox Equation, or measured by DSC. When polymerized, the low $T_g$ (meth)

acrylate copolymer has an $M_w$ greater than or equal to 100 kD and less than or equal to 1000 kD.

The (meth)acrylate ester monomer useful in preparing the low $T_g$ (meth)acrylate adhesive copolymer is a monomeric (meth)acrylic ester of a non-tertiary alcohol, which alcohol contains from 1 to 18 carbon atoms and preferably an average of from 4 to 12 carbon atoms. A mixture of such monomers may be used.

Examples of monomers suitable for use as the (meth) acrylate ester monomer include the esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanal, 1-octanol, 2-octanol, isooctyl-alcohol, 2-1-decanol, 2-propylheptanol, 1-dodecanol, 1-tridecanol, 1-tetradecanol, citronellol, dihydrocitronellol, and the like. In some embodiments, the preferred (meth) acrylate ester monomer is the ester of (meth)acrylic acid with butyl alcohol or isooctyl alcohol, or a combination thereof, although combinations of two or more different (meth)acrylate ester monomer are suitable.

In some embodiments, the preferred (meth)acrylate ester monomer is the ester of (meth)acrylic acid with an alcohol derived from a renewable source, such as 2-octanol, citronellol, dihydrocitronellol.

In some embodiments a portion of the above described (meth)acrylate esters may be substituted with (meth)acrylates derived from 2-alkyl alkanols (Guerbet alcohols) as described in U.S. Pat. No. 8,137,807 (Lewandowski et al.), incorporated herein by reference.

The (meth)acrylate ester monomer is present in an amount of 85 to 99.5 parts by weight based on 100 parts total monomer content used to prepare the low $T_g$ copolymer. Preferably (meth)acrylate ester monomer is present in an amount of 95 to 99 parts by weight based on 100 parts total monomer content of the low $T_g$ copolymer.

The polymer may further comprise an acid functional monomer, where the acid functional group may be an acid per se, such as a carboxylic acid, or a portion may be salt thereof, such as an alkali metal carboxylate. Useful acid functional monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, β-carboxyethyl(meth)acrylate, 2-sulfoethyl methacrylate, styrene sulfonic acid, 2-acrylamido-2-methylpropanesulfonic acid, vinylphosphonic acid, and mixtures thereof.

Due to their availability, acid functional monomers of the acid functional copolymer are generally selected from ethylenically unsaturated carboxylic acids, i.e. (meth)acrylic acids. When even stronger acids are desired, acidic monomers include the ethylenically unsaturated sulfonic acids and ethylenically unsaturated phosphonic acids. The acid functional monomer, when present, is generally used in amounts of 0.5 to 15 parts by weight, preferably 1 to 10 parts by weight, most preferably 1 to 5 parts by weight, based on 100 parts by weight total monomer of the low $T_g$ copolymer.

As used herein the term "polar monomers" are exclusive of acid functional monomers.

Representative examples of suitable polar monomers include but are not limited to 2-hydroxyethyl(meth)acrylate; N-vinylpyrrolidone; N-vinylcaprolactam; acrylamide; mono- or di-N-alkyl substituted acrylamide; t-butyl acrylamide; dimethylaminoethyl acrylamide; N-octyl acrylamide; poly(alkoxyalkyl)(meth)acrylates including 2-(2-ethoxyethoxy)ethyl(meth)acrylate, 2-ethoxyethyl(meth) acrylate, 2-methoxyethoxyethyl(meth)acrylate, 2-methoxyethyl methacrylate, polyethylene glycol mono (meth)acrylates; alkyl vinyl ethers, including vinyl methyl ether; and mixtures thereof. Preferred polar monomers include those selected from the group consisting of 2-hydroxyethyl(meth)acrylate and N-vinylpyrrolidinone. The polar monomer may be present in amounts of 0 to 15 parts by weight, preferably 1 to 10 parts by weight, based on 100 parts by weight total monomer of the low $T_g$ copolymer.

In some preferred embodiments, the non-acid functional polar monomer is a base-functional monomer, including preferred amides and amine-functional monomers.

Exemplary base functional monomers include N,N dimethyl(meth)acrylamide (NNDMA); N,N-diethyl(meth)acrylamide; N,N dimethylaminopropyl methacrylamide (DMAPMAm); N,N diethylaminopropyl methacrylamide (DEAPMAm); N,Ndimethylaminoethyl acrylamide (DMAEAm); N,N dimethylaminoethyl methacrylamide (DMAEMAm); N,N diethylaminoethyl acrylamide (DEAEAm); N,N diethylaminoethyl methacrylamide (DEAEMAm); N-vinyl formamide, (meth)acrylamide; N-methyl acrylamide, N-ethyl acrylamide; N,N-dimethylaminoethyl acrylate (DMAEA); N,N-diethylaminoethyl acrylate (DEAEA); N,N-dimethylaminopropyl acrylate (DMAEA); N,N-diethylaminopropyl acrylate (DEAPA); N,N-dimethylaminoethyl methacrylate (DMAEMA); N,N-diethylaminoethyl methacrylate (DEAEMA); N,N-dimethylaminoethyl vinyl ether (DMAEVE); N,N-diethylaminoethyl vinyl ether (DEAEVE); and mixtures thereof. Other useful basic monomers include vinylpyridine, vinylimidazole, tertiary amino-functionalized styrene (e.g., 4-(N,N-dimethylamino)-styrene (DMAS), 4-(N,N-diethylamino)-styrene (DEAS)), N-vinyl pyrrolidone, N-vinyl caprolactam, acrylonitrile, and mixtures thereof.

When used, vinyl monomers useful in the (meth)acrylate polymer include vinyl esters (e.g., vinyl acetate and vinyl propionate), styrene, substituted styrene (e.g., α-methyl styrene), vinyl halide, and mixtures thereof. As used herein vinyl monomers are exclusive of acid functional monomers, acrylate ester monomers and polar monomers. Such vinyl monomers are generally used at 0 to 5 parts by weight, preferably 1 to 5 parts by weight, based on 100 parts by weight total monomer of the low $T_g$ copolymer.

In such embodiments, the copolymer resulting from the low $T_g$ copolymer or monomer mixture component may comprise:
 i. 85 to 99.5 parts by weight of an (meth)acrylic acid esters (low $T_g$ monomers);
 ii. 0 to 15, preferably 0.5 to 15 parts by weight of an acid-functional ethylenically unsaturated monomer;
 iii. 0 to 15 parts, preferably 1 to 10 parts, by weight by weight of a non-acid functional, ethylenically unsaturated polar monomer;
 iv. 0 to 5 parts vinyl monomer;
 based on 100 parts by weight total monomers of the low $T_g$ copolymer.

In certain embodiments, the low $T_g$ copolymers may contain high $T_g$ monomers having glass transition temperatures of >50° C., as a function of the homopolymer of said high $T_g$ monomers. It has been found that the incorporation of small amounts of high $T_g$ monomers in the low $T_g$ copolymer component improves the compatibility and stabilize the microphase morphology between the low- and high $T_g$ copolymer components, particularly when the high $T_g$ monomer is common to both copolymer components. Alternatively, compatibility and stability may be improved by an acid/base interaction between the two copolymers, when the composition comprises a minimum of 0.05 moles of acid/base pairs per kilogram of the composition.

Suitable high $T_g$ monomers are (meth)acrylate esters and are described in more detail supra. The low $T_g$ copolymer may contain amounts of copolymerized high $T_g$ monomers such that the $T_g$ of the copolymer is ≤20° C., as estimated by the Fox Equation. Generally, the copolymer may contain 1-20 wt. %, preferably 1-10 wt. % high $T_g$ monomers in the low $T_g$ monomer component. Where such high $T_g$ monomers are included, the low $T_g$ copolymer may comprise:

ia. 65 to 98.5 parts by weight of an (meth)acrylic acid ester (low $T_g$ monomers);
 ib 1 to 20 parts by weight of high $T_g$ (meth)acrylic acid ester monomers;
 ii. 0 to 15, preferably 0.5 to 15 parts by weight of an acid-functional ethylenically unsaturated monomer;
 iii. 0 to 15 parts by weight of a non-acid functional, ethylenically unsaturated polar monomer;
 iv. 0 to 5 parts vinyl monomer;
 based on 100 parts by weight total monomers of the low $T_g$ copolymer.

The low $T_g$ copolymers may be prepared by any conventional free radical polymerization method, including solution, radiation, bulk, dispersion, syrup, emulsion, solventless, and suspension processes as described for the high $T_g$ copolymer. The resulting adhesive (co)polymers may be random or block (co)polymers. Preferably, monomer mixture for the low $T_g$ copolymer component is combined with the extant high $T_g$ copolymer and polymerized using the methods described for polymerizing packaged pre-adhesive compositions described in and WO9607522 and U.S. Pat. No. 5,804,610 (Hamer et al.), incorporated herein by reference.

If desired, a chain transfer agent may be added to the monomer mixture of either of the low- or high $T_g$ (co) polymers to produce a (co)polymer having the desired molecular weight. A chain transfer is preferably used in the preparation of the high $T_g$ (co)polymer. It has been observed that when the molecular weight of the high $T_g$ (co)polymer is less than 30 k, the peel performance at elevated temperatures is reduced. Further, when the $M_w$ is greater than about 100 k, the immiscibility of the components is such that the tack of the composition is reduced.

Examples of useful chain transfer agents include but are not limited to those selected from the group consisting of carbon tetrabromide, alcohols, mercaptans, and mixtures thereof. When present, the preferred chain transfer agents are isooctylthioglycolate and carbon tetrabromide. The chain transfer agent may be used in amounts such that the high $T_g$ (co)polymer has a $M_w$ of greater than 30 kD, and preferable less than 100 kD. The monomer mixture may further comprise up to about 5 parts by weight of a chain transfer agent, typically about 0.01 to about 5 parts by weight, if used, preferably about 0.5 parts by weight to about 3 parts by weight, based upon 100 parts by weight of the total monomer mixture.

In some embodiments, the high $T_g$ copolymer is predominately base-functional, and the low $T_g$ copolymer (or monomer mixture thereof) is predominately acid-functional. By predominately acid-functional, it is mean that the molar amount of acid-functional monomers exceeds the molar amount of base-functional monomers. By predominately base-functional, it is mean the molar amounts of base functional monomers exceed the molar amount of acid functional monomers.

In another preferred embodiment, the high $T_g$ (meth) acrylate copolymer component is predominately acid-functional and the low $T_g$ (meth)acrylate copolymer component is predominately base-functional.

The copolymer that is predominately acid-functional may comprise no greater than 0.5 parts by weight of base-functional monomers. The copolymer that is predominately base-functional may comprise no greater than 0.5 parts by weight of acid-functional monomers.

In either of the above embodiments, the resulting mixture benefits from the acid-base interaction of the two copolymers, increasing the compatibility thereof. The compositions of each embodiment preferably comprise a minimum of 0.05 moles of acid/base pairs per kilogram of the composition.

Conventional acrylic adhesives do not adhere well to certain substrates, such as certain types of automotive paints and low energy surfaces (LSE). Efforts have been made to improve the adhesion of acrylic adhesives, i.e., develop more aggressive tack, to these types of surfaces; tackifying the base acrylic polymer is commonly practiced. Various types of tackifiers include phenol modified terpenes, resins such as polyvinyl cyclohexane and poly(t-butyl styrene), and rosin esters such as glycerol esters of rosin and pentaerythritol esters of rosin.

Due to the high solubility parameter of most conventional pressure-sensitive acrylic adhesives and the presence of specific potential interactions between these adhesives and many tackifiers, a limited selection of tackifiers is available to the formulator. As a class, hydrocarbon-based tackifiers, and especially hydrogenated hydrocarbon resins, have been considered unsuitable for use in acrylic adhesives formulations due to their nonpolar character.

However, Applicants have discovered that such hydrogenated hydrocarbon tackifiers may be effectively used in combination with the high- and low $T_g$ copolymers described supra. The tackifiers are used in amounts sufficient to strengthen the partial phase separation extant in the system. Surprisingly, Applicants have found that one can take advantage of the incompatibility of such tackifiers to produce pressure-sensitive adhesive composition. As result of the incompatibility, it is consequently observed that the glass transition of the adhesive composition is further broadened, relative to the combination of the high- and low $T_g$ copolymers, which consequentially further improves its overall adhesions on LSE substrates. On the other hand, if a compatible tackifier (those having good compatibility with the low $T_g$ acrylic polymers) is added to a high- and low $T_g$ copolymers blend, a significant drop in adhesion on LSE substrates is observed, and the advantageous effects from the phase separation of high- and low $T_g$ copolymers are lost.

Hydrogenated hydrocarbon tackifiers are traditionally used in more rubber-based adhesives rather than acrylic-based pressure sensitive adhesives. The hydrogenated hydrocarbon tackifiers are found to be particularly useful in the acrylate-based pressure sensitive adhesives for low surface energy substrates disclosed herein. Exemplary hydrogenated hydrocarbon tackifiers include $C_9$ and $C_5$ hydrogenated hydrocarbon tackifiers. Examples of $C_9$ hydrogenated hydrocarbon tackifiers include those sold under the trade designation: "REGALITE S-5100", "REGALITE R-7100", "REGALITE R-9100", "REGALITE R-1125", "REGALITE S-7125", "REGALITE S-1100", "REGALITE R-1090", "REGALREZ 6108", "REGALREZ 1085", "REGALREZ 1094", "REGALREZ 1126", "REGALREZ 1139", and "REGALREZ 3103", sold by Eastman Chemical Co., Middelburg, Netherlands; "PICCOTAC" and EASTO-TAC" sold by Eastman Chemical Co.; "ARKON P-140", "ARKON P-125", "ARKON P-115", "ARKON P-100", "ARKON P-90", "ARKON M-135", "ARKON M-115", "ARKON M-100", and "ARKON M-90" sold by Arakawa Chemical Inc., Chicago, Ill.; and "ESCOREZ 500" sold by Exxon Mobil Corp., Irving, Tex. Of particular interest are hydrogenated C9 tackifiers.

The hydrogenated hydrocarbon tackifiers are used in amounts of 0.1 to 20 parts by weight, preferably 1 to 15 parts by weight, more preferably 2 to 10 parts by weight, relative to 100 parts of the low-$T_g$ monomer/high-$T_g$ (co)polymer mixture. The tackifier may be added to the mixture of the high $T_g$ copolymer and low $T_g$ monomer mixture prior to, or after polymerization, but before melt extrusion.

The low $T_g$ monomer mixture component, the high $T_g$ copolymer and optionally tackifier is combined with a photoinitiator, mixed until homogenous and further polymerized. Upon polymerization, the product is a mixture of the high- and low-$T_g$ copolymers, and tackifier.

Preferably the components are combined and photopolymerized using the methods described in the methods described for polymerizing packaged pre-adhesive compositions described in WO9607522 (Hamer et al.) and in U.S. Pat. No. 5,804,610 (Hamer et al.), incorporated herein by reference.

In the methods of Hamer, the packaging material used to form the reaction vessel or container is preferably made of a material that when combined with the adhesive composition does not substantially adversely affect the desired adhesive characteristics. A hot melt coated adhesive produced from a mixture of the adhesive composition and the packaging material may have improved adhesive properties compared to a hot melt coated adhesive produced from the adhesive composition alone.

In one embodiment of the disclosure, the reaction mixture is substantially surrounded with the packaging material; in another embodiment of the disclosure, the reaction mixture is completely surrounded with the packaging material. In this embodiment, it is intended that the reaction mixture be completely surrounded by the packaging material, but random variations in production may produce occasional packaged pre-adhesives in which the reaction mixture is not completely surrounded with the packaging material. In yet other embodiments, the reaction mixture is disposed between a pair of sheets.

At least one component of the packaging material (more preferably the entirety of the packaging material) preferably melts at or below the processing temperature of the adhesive (i.e., the glass transition temperature $T_g$, at which the adhesive composition begins to flow). The packaging material preferably has a melting point of 200° C. or less, preferably 170° C. or less. In a preferred embodiment the melting point ranges from 90° C. to 150° C.

The packaging material may be a flexible thermoplastic polymeric film, more preferably an unsupported, non-laminate thermoplastic polymer film. The packaging material is preferably selected from ethylene-vinyl acetate, ethylene-acrylic acid, polypropylene, polyethylene, polybutadiene, or ionomeric films. In a presently preferred embodiment, the packaging material is an ethylene-acrylic acid or ethylene vinyl acetate film.

A currently preferred packaging material for a type I adhesive composition (as described further below) in which the packaging is not removed from the adhesive composition before further processing, is VA24, an ethylene-vinyl acetate film available from Berry Plastics (Evansville, Ind.). Other suitable polymeric films include heat sealable linear low density polyethylene (LLDPE) films produced by 3M Company (St. Paul, Minn.).

In practicing some embodiments of the present disclosure, films ranging in thickness from about 0.01 mm to about 0.25 mm may be used. The thicknesses preferably range from about 0.025 mm to about 0.127 min to obtain films that have good strength during processing while being thin enough to heat seal quickly and minimize the amount of film material used.

The amount of packaging material depends upon the type of material and the desired end properties. The amount of packaging material typically ranges from about 0.5 percent to about 20 percent of the total weight of the reaction mixture and the packaging material. Preferably, the packaging material is between 2 percent and 15 percent by weight, and more preferably between 3 percent and 5 percent.

Suitable packaging materials may contain plasticizers, stabilizers, dyes, perfumes, fillers, slip agents, antiblock agents, flame retardants, anti-static agents, microwave susceptors, thermally conductive particles, electrically conductive particles, and/or other materials to increase the flexibility, handleability, visibility, or other useful property of the film, as long as they do not adversely affect the desired properties of the adhesive.

The packaging material should be appropriate for the polymerization method used. For example, with photopolymerization, it is necessary to use a film material that is sufficiently transparent to ultraviolet radiation at the wavelengths necessary to effect polymerization.

The present disclosure also provides methods in which the packaging material is either retained following polymerization (and thus becomes part of the final product), i.e. a "Type I Composition", or is removed following polymerization and prior to subsequent processing, i.e. a "Type II Composition". The two types of compositions will be discussed separately further below. The description of the two types of products will be made with particular reference to hot melt adhesive compositions.

The present disclosure provides a method of making a packaged, thermoplastic or thermosettable, hot melt adhesive composition. For Type I compositions, the packaging material is selected such that it does not substantially adversely affect the desired adhesive properties of the hot melt adhesive composition when the hot melt adhesive composition and the packaging material are heated above the melting temperature of at least one component of the packaging material, and mixed together to form a flowable, coatable melt.

In one preferred embodiment, the reaction mixture is completely surrounded by the packaging material. Preferably, from 0.1 to 5,000 g of reaction mixture is completely surrounded by the packaging material. In another preferred embodiment, from 1 to 1,000 g of reaction mixture is completely surrounded by the packaging material.

In yet another embodiment of the disclosure, the reaction mixture is substantially surrounded by the packaging material. In a further embodiment, the reaction mixture is disposed between a pair of two substantially parallel sheets of packaging material.

In the Type II compositions, the packaging material is removed after polymerization so that any further processing, e.g., melting, coating, or simply application of the adhesive, involves only the adhesive. The adhesive and reaction mixtures described above in the case of the Type I compositions are equally suitable for the Type II compositions, as are the polymerization processes and conditions used to prepare the adhesive.

The packaging materials described in connection with the Type I compositions are also suitable. However, because the packaging material is removed before any post-polymerization processing, the choice of packaging material is not limited to materials that will not substantially affect the adhesive properties of the final product when melted together. Thus, a wide variety of packaging material may be used, with materials permitting ready removal from the adhesive being preferred.

To enhance the ability to remove the adhesive from the packaging material, the packaging material may be provided with a release material. Examples of applications in which the packaging material is removed prior to post-polymerization processing include moisture-curable sealant compositions. These adhesive compositions would preferably be prepared in the form of a sealed pouch which is stripped to permit application of the sealant composition. Other examples include optically clear adhesives.

In the practice of one embodiment of the disclosure, two lengths of thermoplastic film are heat sealed together across the bottom and on each of the lateral edges on a liquid form-fill-seal machine to form an open ended pouch. The reaction mixture is pumped through a hose to fill the pouch, and the pouch is then heat sealed across the top to completely surround the adhesive composition.

Preferably, the form-fill-seal machine is equipped with an impulse sealer to form the top and bottom seal across the pouches. Such a sealer has one or two sets of jaws that clamp the pouch shut before sealing. A sealing wire is then heated to effect the seal, and the seal is cooled before the jaws are released. The sealing temperature is generally above the softening point and below the melting point of the film used to form the pouch.

During the sealing process, it is desirable to get most of the air out of the pouch before sealing. A small amount of air is tolerable so long as the amount of oxygen is not sufficient to substantially interfere with the polymerization process. For ease of handling, it is desirable to seal the pouches as soon as they are filled with the composition, although immediate sealing is not necessary in all cases. In some cases the reaction mixture can alter the packaging material, and it is desirable to cross-seal the pouches within about one minute of filling, more preferably within 30 seconds, and most preferably within 15 seconds.

If the reaction mixture decreases the strength of the packaging material, it is preferable to polymerize the composition as soon as possible after the reaction mixture is surrounded by the packaging material. It is preferable to polymerize the composition within about 24 hours of sealing the pouches.

The reaction mixture (comprising the high- and low $T_g$ components and optional tackifier) can then be polymerized to form an adhesive composition within the polymeric pouch by any of the aforementioned methods.

In another embodiment of the disclosure, a reaction mixture is coated onto a carrier web, covered with a sheet material, and polymerized with transmissive energy, wherein the carrier web, the sheet material, or both, are hot melt coatable with the adhesive. If both the carrier web and the sheet material are hot melt coatable, the resulting composite can be fed directly into a hot melt coater, or cut into smaller strips or pieces and fed to the hot melt coater. If only one of the carrier web or the sheet material is hot melt-coatable with the adhesive, the non-coatable entity is removed before the adhesive is hot melt coated. To facilitate handling after the non-coatable entity is removed, the polymerized adhesive can be folded over onto itself so that the coatable entity substantially surrounds the major surfaces of the coated adhesive. The adhesive web can then be fed into a hot melt coater, or it can be cut to smaller strips or pieces before hot melt coating.

If either the carrier web or the sheet material are not coatable with the adhesive (e.g., as in the case of Type II compositions, described below), it should be treated, if necessary, so that the adhesive can be removed easily from it. Such treatments include silicone release coatings, polyfluoropolyether coatings, and polyfluoroethylene coatings such as Teflon™.

The carrier web should provide sufficient strength to support the coated reaction mixture during polymerization, or it can be supported by a platen during polymerization. The carrier web can be an endless conveyor belt, or it can be a flexible material which can be wound into a roll with the adhesive; the carrier web is itself a sheet material. Endless conveyor belts can be made from silicone elastomers; polymeric films such as those made from polyfluoroethylene, polyester, nylon, polycarbonate, and the like; metals such as stainless steel; rubber; glass fibers; and the like. Useful flexible materials include paper and polymeric films such as those made from polyester, nylon, polycarbonates, polyolefins, ethylene acrylic acid, ethylene vinyl acetate, ionomers, and the like. Coatable flexible materials include polyolefins such as polypropylene, polyethylene, and polybutadiene; ethylene acrylic acid; ethylene vinyl acetate; and ionomers.

Likewise, the sheet material can be made from the aforementioned flexible materials as well as non-flexible plates made of glass, polymers, or metals, which may optionally be coated with a release material. If the reaction mixture is to be subsequently photo-polymerized, the carrier web, the sheet material, or both should be sufficiently transparent to actinic radiation to effect such photopolymerization.

Preferably, the packaging material does not substantially adversely affect the adhesive properties of a hot melt coated mixture of the packaging material and an adhesive produced from polymerization of the reaction mixture, and a hot melt coated mixture of the adhesive and the packaging material preferably has a storage modulus when measured in torsional shear at 25° C. and at 1 radian/second of between about $10^3$ and about $10^7$ Pa.

The resultant polymerized blend is then further melt processed to produce a homogenous blend. Physical blending devices that provide dispersive mixing, distributive mixing, or a combination of dispersive and distributive mixing are useful in preparing homogenous blends. Both batch and continuous methods of physical blending can be used. Examples of batch methods include BRABENDER (using a BRABENDER PREP CENTER, available from C. W. Brabender Instruments, Inc.; South Hackensack, N.J.) or BANBURY internal mixing and roll milling (using equipment available from FARREL COMPANY; Ansonia, Conn.). Examples of continuous methods include single screw extruding, twin screw extruding, disk extruding, reciprocating single screw extruding, and pin barrel single screw extruding. The continuous methods can include utilizing both distributive elements, such as cavity transfer elements (e.g., CTM, available from RAPRA Technology, Ltd.; Shrewsbury, England) and pin mixing elements, static mixing elements and dispersive elements (e.g., MADDOCK mixing elements or SAXTON mixing elements, as described in "Mixing in Single-Screw Extruders," *Mixing in Polymer*

*Processing*, edited by Chris Rauwendaal (Marcel Dekker Inc.: New York (1991), pp. 129, 176-177, and 185-186).

Generally the molten, extrudable composition is metered into an extrusion die (e.g., a contact or drop die). The shape of the extruded composition is dictated by the shape of the exit opening of the die. Although a variety of shapes may be produced, the extruded composition is typically produced in the form of a continuous or discontinuous sheet. The extrusion die may be a drop die, contact die, profile die, annular die, or a casting die, for example, as described in Extrusion Dies: Design & Engineering Computation, Walter Michaelis, Hanser Publishers, New York, N.Y., 1984, which is incorporated herein by reference in its entirety.

If desired, the smoothness of one or both of the extrudate surfaces can be increased and the thickness reduced by using a nip roll to press the extrudate against a chill roll after the extruded composition exits the die. The thickness of the extruded sheet is preferably from about 0.001 mm to about 5 mm, and more preferably from 0.005 to 0.5 mm. If the sheet is too thin, handling of the adhesive sheet tends to become difficult, while if it is too thick, crosslinking becomes non-uniform in the direction of thickness, and this may reduce the reliability of the adhesive.

The extruded composition may optionally be combined with a liner. Suitable materials for liner include silicone release liners, polyester films (e.g., polyethylene terephthalate films), and polyolefin films (e.g., polyethylene films). The liner and the extruded composition may be laminated together between a pair of nip rollers.

Following extrusion, the extrudate may be exposed to radiation from an electron beam source to crosslink the adhesive. Crosslinking improves the cohesive strength of the adhesive. The irradiation conditions for the electron beam need only be sufficient to generate radicals on the extruded composition and will depend on the types and thicknesses of the material and the degree of crosslinking desired, but the irradiation will generally be conducted with at least 10 keV of an acceleration electric field, and at least 10 kGy of a dose. It is preferably 50-200 keV of an acceleration electric field, and 30-1000 kGy of a dose.

A variety of procedures for E-beam curing are well-known. The cure depends on the specific equipment used to deliver the electron beam, and those skilled in the art can define a dose calibration model for the equipment used. Commercially available electron beam generating equipment are readily available. For example, the radiation processing may be performed on a Model CB-300 electron beam generating apparatus (available from Energy Sciences, Inc. (Wilmington, Mass.). Generally, a support film (e.g., polyester terephthalate support film) runs through an inert chamber. In some embodiments, a sample of uncured material with a liner (e.g., a release liner) on both sides ("closed face") may be attached to the support film and conveyed at a fixed speed of about 6.1 meters/min (20 feet/min). In some embodiments, a sample of the uncured material may be applied to one liner, with no liner on the opposite surface ("open face"). The uncured material may be exposed to E-beam irradiation from one side through the release liner. For making a single layer laminating adhesive type tape, a single pass through the electron beam equipment may be sufficient. Thicker samples, such as a foam tape, may exhibit a cure gradient through the cross section of the tape so that it may be desirable to expose the uncured material to electron beam radiation from both sides. The crosslinking methods of the present disclosure do not require the use of crosslinking agents, catalysts or initiators to effect crosslinking. Thus, the methods of the present disclosure can be used to cure compositions that are "substantially free" of such crosslinking agents.

In preferred embodiments, the melt-processed adhesive composition is laminated or otherwise coated on a substrate, backing or liner, and crosslinked by e-beam. In other preferred embodiments, the melt-processed adhesive composition is coextruded with a substrate, backing or liner, and crosslinked by e-beam.

The use of e-beam allows crosslinking at lower temperatures, obviates the need of compounding thermally sensitive chemical crosslinking agents in the melt processed composition, provides more uniform cure to thicker adhesive layers. Further, the crosslinked adhesive is not contaminated with the residue of chemical crosslinking agents.

The electron beam crosslinked adhesive composition comprises at least 60 parts by weight, preferably 70, more preferably 80, of the low $T_g$ copolymer component, and up to 40 parts by weight, preferably 5 to 40 parts by weight, of the high $T_g$ (co)polymer, with the sum of the high- and low $T_g$ copolymer components 100 parts by weight. The tackifier is used in amounts sufficient to effect a partial phase separation of the components, and is generally used in amounts of 0.1 to 15 parts, preferably 0.1 to 10 parts by weight, relative to 100 parts by weight of the high- and low $T_g$ (co)polymer components. In other words, the high $T_g$, low $T_g$ copolymers and tackifier are combined in the recited amounts, and crosslinked by exposure to electron beam.

Although not preferred, other crosslinking additives may be added to the adhesive composition—the combination of the high- and low $T_g$ (co)polymers and the tackifier. Two main types of crosslinking additives are exemplary. The first crosslinking additive is a thermal crosslinking additive such as multifunctional aziridine, isocyanate and epoxy. One example of aziridine crosslinker is 1,1'-isophthaloyl-bis(2-methylaziridine (CAS No. 7652-64-4). Such chemical crosslinkers can be added into adhesives after polymerization and activated by heat during oven drying of the coated adhesive. Although polyfunctional (meth)acrylates may be included in the low $T_g$ copolymer component and may function as crosslinking agents, additional crosslinking agents may be added.

In another embodiment, chemical crosslinkers, which rely upon free radicals to carry out the crosslinking reaction, may be employed. Reagents such as, for example, peroxides serve as a source of free radicals. When heated sufficiently, these precursors will generate free radicals that bring about a crosslinking reaction of the polymer. A common free radical generating reagent is benzoyl peroxide. Free radical generators are required only in small quantities, but generally require higher temperatures to complete a crosslinking reaction than those required for the bisamide and isocyanate reagents.

The second type of crosslinking additive is a photosensitive crosslinker, which is activated by high intensity ultraviolet (UV) light. Two common photosensitive crosslinkers used for acrylic PSAs are benzophenone and copolymerizable aromatic ketone monomers as described in U.S. Pat. No. 4,737,559 (Kellen et al.) Another photocrosslinker, which can be post-added to the solution or syrup copolymer and activated by UV light is a triazine, for example, 2,4-bis (trichloromethyl)-6-(4-methoxy-phenyl)-s-triazine. These crosslinkers are activated by UV irradiation In some embodiments, multifunctional acrylates may be used to increase the cohesive strength. Multi-functional acrylates are particularly useful for emulsion polymerization. Examples of useful multi-functional acrylate crosslinking agents include, but are not limited to, diacrylates, triacrylates, and tetraacrylates, such as 1,6-hexanediol diacrylate, polyethylene glycol) diacrylates, polybutadiene diacrylate, polyurethane diacrylates, and propoxylated glycerin triacrylate, and mixtures thereof.

Hydrolyzable, free-radically copolymerizable cross-linkers, such as monoethylenically unsaturated mono-, di-, and trialkoxysilane compounds including, but not limited to, methacryloxypropyltrimethoxysilane (available from Gelest, Inc., Tullytown, Pa.), vinyl dimethylethoxysilane, vinyl methyl diethoxysilane, vinyltriethoxysilane, vinyltrimethoxysilane, vinyltriphenoxysilane, and the like, are also useful crosslinking agents.

The amount and identity of the crosslinking agent is tailored depending upon application of the adhesive composition. Typically, the crosslinking agent is present in amounts less than 5 parts based on total dry weight of adhesive composition. More specifically, the crosslinker may be present in amounts from 0.01 to 5 parts, preferably 0.05 to 1 parts, based on 100 parts total copolymer(s) and monomer.

It is observed that the combination of the low $T_g$ and high $T_g$ (co)polymer components yields a microphase-separated pressure-sensitive adhesive after curing or drying wherein the low $T_g$ copolymer is a continuous phase and the high $T_g$ (co)polymer exists as relatively uniformly-shaped inclusions ranging in size from about 0.01 micrometer to about 0.1 micrometer. The microphase domains are separated by a diffuse boundary caused by the intermixing of the partially incompatible components at the interfaces. It was also observed that the microphase separation broadens the glass transition of the adhesive composition, relative to that of the composition where the high and low $T_g$ monomers were copolymerized in a random fashion. One estimate of this effect is the peak width at a fixed height (FHPW) at half of the peak intensity of the Tan Delta curve from a dynamic mechanical analysis.

Surprisingly, a pressure-sensitive adhesive tape having an adhesive layer comprising such a composition, and exhibiting microphase separation, provides substantial improvement in both peel adhesion and shear-holding capability on LSE substrates, when compared to compositions having a homogenous structure or those having macro-phase separation. In particular, exceptional improvements in adhesion properties at elevated temperatures were achieved. It was found that such advantageous phase-separating effects were dependent on the $M_w$ of the high $T_g$ (co)polymer. If $M_w$ of the high $T_g$ (co)polymer was less than 30K, the phase-separating effects were not sufficient to yield satisfactory adhesion performances at elevated temperatures.

A pressure-sensitive adhesive tape having an adhesive layer comprising such a composition, and exhibiting microphase separation, provides substantial improvement in both peel adhesion while maintaining acceptable values for other adhesive properties such as shear, when compared to compositions having a homogenous structure or those having macro-phase separation.

Other additives can be added in order to enhance the performance of the adhesive compositions. For example, leveling agents, ultraviolet light absorbers, hindered amine light stabilizers (HALS), oxygen inhibitors, wetting agents, rheology modifiers, defoamers, biocides, dyes and the like, can be included herein. All of these additives and the use thereof are well known in the art. It is understood that any of these compounds can be used so long as they do not deleteriously affect the adhesive properties. Such optional additives are generally added in the melt blending step.

Useful as additives to the present compositions are UV absorbers and hindered amine light stabilizers. UV absorbers and hindered amine light stabilizers act to diminish the harmful effects of UV radiation on the final cured product and thereby enhance the weatherability, or resistance to cracking, yellowing and delamination of the coating. A preferred hindered amine light stabilizer is bis(1,2,2,6,6-pentamethyl-4-piperidinyl) [3,5-bis(1,1-dimethylethyl-4-hydroxyphenyl)methyl]butylpropanedioate, available as Tinuvin™ 144, from BASF.

In some embodiments the composition may include filler. Such compositions may include at least 40 wt-%, more preferably at least 45 wt-%, and most preferably at least 50 wt-% filler, based on the total weight of the composition. In some embodiments the total amount of filler is at most 90 wt-%, preferably at most 80 wt-%, and more preferably at most 75 wt-% filler, based on the total weigh of the composition.

Fillers may be selected from one or more of a wide variety of materials, as known in the art, and include organic and inorganic filler. Inorganic filler particles include silica, submicron silica, zirconia, submicron zirconia, and non-vitreous microparticles of the type described in U.S. Pat. No. 4,503,169 (Randklev).

Filler components include nanosized silica particles, nanosized metal oxide particles, and combinations thereof. Nanofillers are also described in U.S. Pat. No. 7,090,721 (Craig et al.), U.S. Pat. No. 7,090,722 (Budd et al.), U.S. Pat. No. 7,156,911 (Kangas et al.), and U.S. Pat. No. 7,649,029 (Kolb et al.).

Fillers may be either particulate or fibrous in nature. Particulate fillers may generally be defined as having a length to width ratio, or aspect ratio, of 20:1 or less, and more commonly 10:1 or less. Fibers can be defined as having aspect ratios greater than 20:1, or more commonly greater than 100:1. The shape of the particles can vary, ranging from spherical to ellipsoidal, or more planar such as flakes or discs. The macroscopic properties can be highly dependent on the shape of the filler particles, in particular the uniformity of the shape.

In some embodiments, the composition preferably comprise a nanoscopic particulate filler (i.e., a filler that comprises nanoparticles) having an average primary particle size of less than about 0.100 micrometers (i.e., microns), and more preferably less than 0.075 microns. As used herein, the term "primary particle size" refers to the size of a non-associated single particle. The average primary particle size can be determined by cutting a thin sample of hardened composition and measuring the particle diameter of about 50-100 particles using a transmission electron micrograph at a magnification of 300,000 and calculating the average. The filler can have a unimodal or polymodal (e.g., bimodal) particle size distribution. The nanoscopic particulate material typically has an average primary particle size of at least about 2 nanometers (nm), and preferably at least about 7 nm. Preferably, the nanoscopic particulate material has an average primary particle size of no greater than about 50 nm, and more preferably no greater than about 20 nm in size. The average surface area of such a filler is preferably at least about 20 square meters per gram ($m^2/g$), more preferably, at least about 50 $m^2/g$, and most preferably, at least about 100 $m^2/g$.

The adhesives of the present invention may be coated upon a variety of flexible and inflexible backing materials using conventional coating techniques to produce adhesive-coated materials. Flexible substrates are defined herein as any material which is conventionally utilized as a tape backing or may be of any other flexible material.

Examples include, but are not limited to plastic films such as polypropylene, polyethylene, polyvinyl chloride, polyester (polyethylene terephthalate), polycarbonate, polymethyl (meth)acrylate (PMMA), cellulose acetate, cellulose triacetate, and ethyl cellulose. Foam backings may be used. Examples of inflexible substrates include, but are not limited to, metal, metallized polymeric film, indium tin oxide coated glass and polyester, PMMA plate, polycarbonate plate, glass, or ceramic sheet material. The adhesive-coated sheet materials may take the form of any article conventionally known to be utilized with adhesive compositions such as labels, tapes, signs, covers, marking indices, display components, touch panels, and the like. Flexible backing materials having microreplicated surfaces are also contemplated.

The above-described compositions are coated on a substrate using conventional melt coating techniques prior to e-beam crosslinking, modified as appropriate to the particular substrate. For example, these compositions can be applied to a variety of solid substrates by methods such as roller coating, flow coating, dip coating, spin coating, spray coating knife coating, and die coating. These various methods of coating allow the compositions to be placed on the substrate at variable thicknesses thus allowing a wider range of use of the compositions. Coating thicknesses may vary, but coating thicknesses of 2-500 microns (dry thickness), preferably about 25 to 250 microns, are contemplated.

The adhesives of the present disclosure are particularly useful for forming strong bonds to low surface energy (LSE) substrates. As used herein, low surface energy substrates are those having a surface energy of less than about 45 dynes per centimeter, more typically less than about 40 dynes per centimeter, and most typically less than about 35 dynes per centimeter. Included among such materials are polypropylene, polyethylene (e.g., high density polyethylene or HDPE), polystyrene and poly(methyl methacrylate) (PMMA). Other substrates may also have properties of low surface energy due to a residue, such as an oil residue or a film such as a paint, being on the surface of the substrate. However, even though the present adhesive bonds well to low surface energy surfaces, the invention is not limited to being bonded to low surface energy substrates, as it has been found that the inventive adhesive can also bond well to higher surface energy substrates such as, for example, other plastics, ceramics (e.g., glass), metals.

Surface energy of solid surfaces may be determined from standard reference texts such as James E Mark, *Physical Properties of Polymers Handbook*, Chapter 59, Surface and Interfacial Properties, pp 1011-1019, or may be estimated using the procedures described by Fox, H. W. and Zisman, W. A., J. Colloid. Science, 5 (1950), p. 514; also Zisman, W. A., "Relation of Equilibrium Contact Angle to Liquid and Solid Constitution", Chapter 1 in Contact Angle, Wettability, and Adhesion, R. F. Gould, ed., American Chemical Society, Washington D.C., 1964.

The substrate is selected depending on the particular application in which it is to be used. For example, the adhesive can be applied to sheeting products, (e.g., decorative graphics and reflective products), label stock, and tape backings. Additionally, the adhesive may be applied directly onto a substrate such as an automotive panel, or a glass window so that another substrate or object can be attached to the panel or window.

The adhesive can also be provided in the form of a pressure-sensitive adhesive transfer tape in which at least one layer of the adhesive is disposed on a release liner for application to a permanent substrate at a later time. The adhesive can also be provided as a single coated or double coated tape in which the adhesive is disposed on a permanent backing.

Backings can be made from plastics (e.g., polypropylene, including biaxially oriented polypropylene, vinyl, polyethylene, polyester such as polyethylene terephthalate), nonwovens (e.g., papers, cloths, nonwoven scrims), metal foils, foams (e.g., polyacrylic, polyethylene, polyurethane, neoprene), and the like. Foams are commercially available from various suppliers such as 3M Co., Voltek, Sekisui, and others. The foam may be formed as a coextruded sheet with the adhesive on one or both sides of the foam, or the adhesive may be laminated to it. When the adhesive is laminated to a foam, it may be desirable to treat the surface to improve the adhesion of the adhesive to the foam or to any of the other types of backings. Such treatments are typically selected based on the nature of the materials of the adhesive and of the foam or backing and include primers and surface modifications (e.g., corona treatment, surface abrasion). Additional tape constructions include those described in U.S. Pat. No. 5,602,221 (Bennett et al.), incorporated herein by reference.

For a single-sided tape, the side of the backing surface opposite that where the adhesive is disposed is typically coated with a suitable release material. Release materials are known and include materials such as, for example, silicone, polyethylene, polycarbamate, polyacrylics, and the like. For double coated tapes, another layer of adhesive is disposed on the backing surface opposite that where the adhesive of the invention is disposed. The other layer of adhesive can be different from the adhesive of the invention, e.g., a conventional acrylic PSA, or it can be the same adhesive as in this disclosure, with the same or a different formulation. Double coated tapes are typically carried on a release liner.

In some preferred embodiments, the foam backing is an acrylic foam comprising a plurality of expandable polymeric microspheres as described in U.S. Pat. No. 6,103,152, U.S. Pat. No. 6,797,371 and U.S. Pat. No. 7,879,441 (Gehlsen et al.) incorporated herein by reference. The foam articles of Gehlsen are prepared by melt-mixing a polymer composition and a plurality of microspheres, at least one of which is an expandable polymeric microsphere, under process conditions, including temperature and shear rate, selected to form an expandable extrudable composition; and extruding the composition through a die. In some embodiments one or both major surface of the foam may be coated or laminated with the adhesive of this disclosure. In some embodiments, one or more adhesive layers of this disclosure may be coextxuded with the foam backing.

EXAMPLES

All amounts are stated as parts by weight unless otherwise indicated.

Materials Used in Examples and Suppliers

AA—Acrylic acid; Alfa Aesar, Ward Hill, Mass.

IBOA—Isobornyl acrylate; San Esters Corp., New York, N.Y.

nnDMA—N,N-Dimethylacrylamide; Alfa Aesar, Ward Hill, Mass.

IOTG—Isooctylthioglycolate; Showa Denko Corp. Tokyo, Japan

R1126—Regalrez 1126 fully hydrogenated hydrocarbon tackifier; Eastman Chemical, Kingsport, Tenn.

P140—Arkon P140 fully hydrogenated hydrocarbon tackifier; Arakawa Chemical (USA) Inc., Chicago, Ill.

The following materials were obtained from BASF, Ludwigshafen, Germany
- 2-EHA—2-ethylhexyl acrylate
- Irg651—Irgacure™ 651 photoinitiator
- Irg1010—Irganox™ 1010 photoinitiator The following materials were obtained from Dupont Wilmington, Del.
- Vazo 52—2,2'-Azobis(2,4-dimethylvaleronitrile)
- Vazo 67—2,2'azobis-(2-methylbutyronitrile)
- Vazo 88—1,1'-Azodicyclohexanecarbonitrile The following materials were obtained from Arkema, King of Prussia, Pa.
- Lupersol 101—2,5-Bis(tert-butylperoxy)-2,5-dimethylhexane
- Lupersol 130—2,5-Di(tert-butylperoxy)-2,5-dimethyl-3-hexyne Test Methods 90° Angle Peel Adhesion Strength—Room Temperature (Approximately 23° C.)

The peel adhesion strength of an adhesive at a removal angle of 90° was performed according to the procedure described in the ASTM International standard D3330, Method F.

The test was conducted on an MASS SP-2000 slip/peel tester (available from IMASS, Inc., Accord, Mass.) at a peel rate of 431.8 mm/minute (17 inches/minute) and 7.8 mm/minute (0.3 inches/minute).

Polypropylene (PP) test panels (5 cm×12.5 cm panels obtained from QUADRANT Engineering Plastics Products USA, Inc., Reading, Pa.) were prepared by wiping the panels with a tissue wetted with the Isopropyl Alcohol 8-10 times using hand pressure. The procedure was repeated two more times with clean tissues wetted with solvent. The cleaned panels were air dried.

A test specimen was prepared by rolling down a 1.3 cm×20 cm (½ in.×8 in.) strip of adhesive tape onto a PP test panel using 4 passes of a 2.0 kg (4.5 lb.) rubber roller. The test specimen was conditioned at the following condition: 4 hours at 23° C. and 50% relative humidity. The average force, based on 2 replicates, required to peel the tape from the panel was measured in ounces and is expressed in Newtons/meter (N/m).

Peel Creep Holding Strength

A test specimen was prepared by rolling down a 2.5 cm×2.5 cm (1 in×1 in) strip of adhesive tape onto a PP test panel (cleaned as described above for the peel test) using 4 passes of a 2.0 kg (4.5 lb) rubber roller. The test specimen was conditioned at the following condition: 12 hours at 23° C. and 50% relative humidity, and then hung 180° peel vertically downwards with the following weights: A-40 grams B-100 grams, in an oven set at 70° C. The hanging time was recorded by a timer.

Static Shear Strength at 70° C.

The static shear strength of an adhesive was determined according to ASTM International standard, D3654, Procedure A, using a 250 g load inside an oven set at 70° C. A test specimen was prepared by laminating a 1.3 cm×2.5 cm (½ in.×1 in.) piece of adhesive or tape on a PP panel, cleaned as described above for the peel test. The time to failure, i.e., time for the weight to pull the adhesive away from panel in minutes was recorded. If no failure was observed after 10,000 minutes, the test was stopped and a value of 10,000+ minutes was recorded.

Molecular Weight Measurement

The weight average molecular weight of the polymers was determined using conventional gel permeation chromatography (GPC). The GPC apparatus, obtained from Waters Corporation (Milford, Mass.), included a high pressure liquid chromatography pump (Model 1515HPLC), an autosampler (Model 717), a UV detector (Model 2487), and a refractive index detector (Model 2410). The chromatograph was equipped with two 5 micron PLgel MIXED-D columns, available from Varian Inc. (Palo Alto, Calif.).

Polymeric solutions for testing were prepared by dissolving a polymer in tetrahydrofuran at a concentration of 2% by weight and filtering through a 0.2 micron polytetrafluoroethylene filter (available from VWR International; West Chester, Pa.). The resulting solution was injected into the GPC and eluted at a rate of 1 milliliter per minute through the columns maintained at 35° C. The system was calibrated with polystyrene standard using a linear least squares analysis to establish a calibration curve. The weight average molecular weight ($M_w$) was calculated for each sample from the calibration curve.

Preparation of High Tg Acrylic Copolymers (HTGP1-HTGP6)

The polymerization of various monomers as further described was carried out by a two step reaction using a Vent Size Package 2 (VSP2) adiabatic reaction apparatus equipped with a 316 stainless steel test can (available from Fauske and Associates Inc, Burr Ridge Ill.).

TABLE 1

Composition for high Tg copolymers polymerization.

| High Tg polymer | 2-EHA (pbw) | IBOA (pbw) | AA (pbw) | nnDMA (pbw) | Irganox 1010 (pbw) | Reaction1 Vazo 52 (pbw) | Reaction2 Vazo 52 (pbw) | Reaction2 Vazo 67 (pbw) | Reaction2 Vazo 88 (pbw) | Reaction2 Lupersol 101 (pbw) | Reaction2 Lupersol 130 (pbw) |
|---|---|---|---|---|---|---|---|---|---|---|---|
| HTGP-1 | — | 97 | 3 | — | 0.1 | 0.002 | 0.018 | 0.004 | 0.006 | 0.006 | 0.008 |
| HTGP-2 | — | 97 | 3 | — | 0.1 | 0.002 | 0.018 | 0.004 | 0.006 | 0.006 | 0.008 |
| HTGP-3 | 15 | 80 | 5 | — | 0.1 | 0.006 | 0.018 | 0.004 | 0.006 | 0.006 | 0.008 |
| HTGP-4 | — | 90 | — | 10 | 0.1 | 0.001 | 0.018 | 0.004 | 0.006 | 0.006 | 0.008 |
| HTGP-5 | — | 95 | — | 5 | 0.1 | 0.002 | 0.012 | 0.004 | 0.006 | 0.006 | 0.008 |
| HTGP-6 | — | 97 | — | 3 | 0.1 | 0.002 | 0.012 | 0.004 | 0.006 | 0.006 | 0.008 |

Reaction Procedure:

In the first step of the polymerization, the VSP2 reactor test can was charged with 80 grams of a mixture consisting the monomer mixture, and amounts shown in Table 1, along with 0.1 pbw Irganox 1010, 3 pbw chain transfer agent (IOTG), 0.02 pbw MEHQ and Vazo 52 amount as shown. The reactor was sealed and purged of oxygen and then held at approximately 100 psig (793 kPa) nitrogen pressure. The reaction mixture was heated to 60° C. and the reaction proceeded adiabatically. When the reaction was complete, the mixture was cooled to below 50° C.

To 75.00 grams of the reaction product of the first step was added the Vazo 52, Vazo 67, Vazo 88, Lupersol 101, and Lupersol 130 amounts as shown in Table 1 (the initiator components were added as a 0.7 gram solution dissolved in ethyl acetate). The chain transfer agent was then added (½ the amount from step 1. The reactor was sealed and purged of oxygen and held at 100 psig (793 kPa) nitrogen pressure. The reaction mixture was heated to 60° C. and the reaction proceeded adiabatically.

The high Tg polymers used in the later examples and comparative examples are listed in the following Table 2.

TABLE 2

Compositions and Mw and Tg of high $T_g$ copolymers

| High Tg polymer | 2-EHA (pbw) | IBOA (pbw) | AA (pbw) | nnDMA (pbw) | Mw | *Tg (° C.) |
|---|---|---|---|---|---|---|
| HTGP-1 | — | 97 | 3 | — | 33,190 | 75.0 |
| HTGP-2 | — | 97 | 3 | — | 58,600 | 85.0 |
| HTGP-3 | 15 | 80 | 5 | — | 21660 | 66.0 |
| HTGP-4 | — | 90 | — | 10 | 97,040 | 78.1 |
| HTGP-5 | — | 95 | — | 5 | 10,020 | 49.8 |
| HTGP-6 | — | 97 | — | 3 | 8,035 | 51.7 |

*The Tg was measured by DSC.

Preparation of Low $T_g$ Acrylic Copolymer

Low $T_g$ polymers were prepared by a bulk polymerization within a polymeric pouch initiated by ultra-violet radiation according to the method described in WO9607522 and U.S. Pat. No. 5,804,610 (Hamer et al.). The photo initiator used was a 2,2-dimethoxyl-1,2-diphenyl-ethanone, available under the trade name IRGACURE 651 from Ciba Specialty Chemicals Incorporated, Tarrytown, N.Y. The composition of low $T_g$ polymers are listed in Table 3

TABLE 3

Compositions of low $T_g$ acrylic copolymer

| Low Tg polymer | 2-EHA (pbw) | IBOA (pbw) | AA (pbw) | nnDMA (pbw) | IRGACURE 651 (pbw) | IOTG (pbw) | *Tg (° C.) |
|---|---|---|---|---|---|---|---|
| LTGP-1 | 86.5 | 11 | 2.5 | — | 0.15 | 0.04 | −49.2 |
| LTGP-2 | 82.0 | 2.0 | 11.0 | 5.0 | 0.15 | 0.02 | −44.2 |
| LTGP-3 | 87.0 | 7.0 | 2.0 | 4.0 | 0.10 | 0.02 | −49.4 |
| LTGP-4 | 84.0 | 11.0 | 1.0 | 4.0 | 0.15 | 0.02 | −46.4 |
| LTGP-5 | 88.0 | 5.0 | 2.0 | 5.0 | 0.15 | 0.02 | −50.3 |
| LTGP-6 | 93.0 | 0 | 2.0 | 5.0 | 0.15 | 0.02 | −55.2 |
| LTGP-7 | 86 | 11 | 0 | 3 | 0.15 | 0.03 | −48.6 |
| LTGP-8 | 89 | 5 | 2 | 4 | 0.01 | 0.02 | −54.1 |
| LTGP-9 | 94 | 0 | 2 | 4 | 0.01 | 0.02 | −56.3 |

*Tg was calculated according to the Fox Equation

Preparation of Examples and Comparative Examples

Approach 1: Adding low $T_g$ acrylic copolymer, high $T_g$ polymer, and tackifiers separately in a twin screw extruder, and then mixing according to the blend compositions.

Approach 2: Dissolving high $T_g$ polymer in acrylic monomers, and bulk-polymerizing the acrylic monomers into low $T_g$ copolymer within a polymeric package, initiated by ultra-violet radiation according to the method described in WO9607522 and in U.S. Pat. No. 5,804,610 (Hamer et al.). Then combining the packaged mixture of high Tg polymer and low Tg acrylic copolymer with tackifiers in a twin screw extruder.

Approach 3: Dissolving high $T_g$ polymer and tackifiers in acrylic monomers, and bulk-polymerizing the acrylic monomers into low $T_g$ copolymer within a polymeric package, initiated by ultra-violet radiation according to the method described in WO9607522 and in U.S. Pat. No. 5,804,610 (Hamer et al.). Then adding the packaged mixture of high $T_g$ polymer, low $T_g$ acrylic copolymer and tackifiers directly in a twin screw extruder.

The total extruder throughput was about 10 lb·hr (5 kg/hr). the screw speed was 200-300 rpm. The extruder was an 18 mm co-rotating twin screw extruder with a sequence of mixing and conveying section, operation at a temperature of 350° F. (175° C.).

Pressure sensitive adhesive tapes were prepared by hot melt extruding the adhesive composition between a 51 micron (2 mil) transparent release liner (CPFilms® T10 from Solutia Inc., St. Louis, Mo.) and a 51 micron polyester film backing (HOSTAPHAN 3SAB available from Mitsubishi Polyester Film, Inc., Greer, S.C.). The hot melt extrusion condition is also described in last section. The adhesive thickness is 51 micron. The adhesive layer was cured with 200 KeV/6 Mrads electron beam, with the T10 release liner facing the radiation source. The tapes were stored at 23° C. and 50% relative humidity.

For each mixture prepared, the number of acid-base interactions per kg of adhesive composition was calculated as follows: the acid-base pair mole number per 1 kg=The lower of the acid or base mole number per 1 kg The acid mole number per 1 kg=1000×(A %)×(acid % in A)/FW of acid monomer The base mole number per 1 kg=1000×(B %)×(base % in B)/FW of base monomer where A and B represent the high $T_g$ and low $T_g$ copolymers, respectively.

The formula weight (FW) of the acrylic acid (AA) used is 72 g/mol. The FW of the N, N dimethyl acrylamide (NNDMA) used is 99 g/mol.

The compositions, molecular weight, and glass transition temperatures of the (meth)acrylate copolymers used in the examples are summarized in Table 4.

TABLE 4

| | lowTg polymer | | | | | | high Tg polymer | | | | | |
|---|---|---|---|---|---|---|---|---|---|---|---|---|
| Example | 2-EHA pbw | AA pbw | IBOA pbw | NN-DMA pbw | MW kD | Fox Tg C | 2-EHA pbw | IBOA pbw | AA pbw | NN-DMA pbw | MW kD | DSC Tg C |
| 1 | 86.5 | 2.5 | 11 | | 550 | −49.2 | | 97 | 3 | | 33.2 | 75.0 |
| 2 | 86.5 | 2.5 | 11 | | 530 | −49.2 | | 97 | 3 | | 33.2 | 75.0 |
| 3 | 86.5 | 2.5 | 11 | | 400 | −49.2 | | 97 | 3 | | 33.2 | 75.0 |
| C1 | 86.5 | 2.5 | 11 | | 700 | −49.2 | 15 | 80 | 5 | | 21.7 | 66.0 |
| C2 | 86.5 | 2.5 | 11 | | 415 | −49.2 | 15 | 80 | 5 | | 21.7 | 66.0 |
| 4 | 86.5 | 2.5 | 11 | | 490 | −49.2 | | 90 | | 10 | 97.0 | 78.0 |
| 5 | 86.5 | 2.5 | 11 | | 420 | −49.2 | | 90 | | 10 | 97.0 | 78.0 |
| 6 | 86.5 | 2.5 | 11 | | 400 | −49.2 | | 90 | | 10 | 97.0 | 78.0 |

TABLE 4-continued

| | lowTg polymer | | | | | | high Tg polymer | | | | | |
|---|---|---|---|---|---|---|---|---|---|---|---|---|
| Example | 2-EHA pbw | AA pbw | IBOA pbw | NN-DMA pbw | MW kD | Fox Tg C | 2-EHA pbw | IBOA pbw | AA pbw | NN-DMA pbw | MW kD | DSC Tg C |
| 7 | 86 | | 11 | 3 | 480 | | | 97 | 3 | | 33.2 | 75.0 |
| 8 | 84 | 1 | 11 | 4 | 615 | −46.4 | | 97 | 3 | | 33.2 | 75.0 |
| 9 | 82 | 2 | 11 | 5 | 590 | −44.2 | | 97 | 3 | | 33.2 | 75.0 |
| 10 | 87 | 2 | 7 | 4 | 710 | −49.4 | | 97 | 3 | | 58.6 | 85.0 |
| C3 | 86.5 | 2.5 | 11 | | | −49.2 | | 95 | | 5 | 10.0 | 49.8 |
| C4 | 86.5 | 2.5 | 11 | | | −49.2 | | 95 | | 5 | 10.0 | 49.8 |
| C5 | 86.5 | 2.5 | 11 | | | −49.2 | | 95 | | 5 | 10.0 | 49.8 |
| C6 | 86.5 | 2.5 | 11 | | | −49.2 | | 97 | | 3 | 8.0 | 51.7 |
| C7 | 86.5 | 2.5 | 11 | | | −49.2 | | 97 | | 3 | 8.0 | 51.7 |
| C8 | 86.5 | 2.5 | 11 | | | −49.2 | | 97 | | 3 | 8.0 | 51.7 |
| 11 | 84 | 1 | 11 | 4 | 701 | −46.4 | | 97 | 3 | | 33.2 | 75.0 |
| 12 | 82 | 2 | 11 | 5 | 643 | −44.2 | | 97 | 3 | | 33.2 | 75.0 |
| 13 | 88 | 2 | 5 | 5 | 645 | −50.3 | | 97 | 3 | | 33.2 | 75.0 |
| 14 | 93 | 2 | 0 | 5 | 679 | −55.2 | | 97 | 3 | | 33.2 | 75.0 |
| 15 | 87 | 2 | 7 | 4 | | −49.4 | | 97 | 3 | | 33.2 | 75.0 |
| 16 | 89 | 2 | 5 | 4 | | | | 97 | 3 | | 33.2 | 75.0 |
| 17 | 94 | 2 | 0 | 4 | | | | 97 | 3 | | 33.2 | 75.0 |

The adhesive compositions including the relative amounts of the low $T_g$ and high $T_g$ polymers, and the tackifier are shown in Table 5 along with the calculated number of acid-base interactions.

TABLE 5

| | | | | | mol/kg of mixture | | | | |
|---|---|---|---|---|---|---|---|---|---|
| Example | Low Tg polymer pbw | High Tg polymer pbw | Tackifier pbw | Mixing approach | Acid from low Tg | Acid from high Tg | Base from low Tg | Base from high Tg | Total acid/ base pairs |
| 1 | 100 | 11.11 | 8.33 | 1 | 0.291 | 0.039 | 0.000 | 0.000 | 0.000 |
| 2 | 100 | 11.11 | 8.33 | 2 | 0.291 | 0.039 | 0.000 | 0.000 | 0.000 |
| 3 | 100 | 11.11 | 8.33 | 3 | 0.291 | 0.039 | 0.000 | 0.000 | 0.000 |
| C1 | 100 | 11.11 | 8.33 | 2 | 0.291 | 0.065 | 0.000 | 0.000 | 0.000 |
| C2 | 100 | 11.11 | 8.33 | 3 | 0.291 | 0.065 | 0.000 | 0.000 | 0.000 |
| 4 | 100 | 11.11 | 8.33 | 1 | 0.291 | 0.000 | 0.000 | 0.094 | 0.094 |
| 5 | 100 | 11.11 | 8.33 | 2 | 0.291 | 0.000 | 0.000 | 0.094 | 0.094 |
| 6 | 100 | 11.11 | 8.33 | 3 | 0.291 | 0.000 | 0.000 | 0.094 | 0.094 |
| 7 | 100 | 11.11 | 8.33 | 2 | 0.000 | 0.039 | 0.254 | 0.000 | 0.039 |
| 8 | 100 | 11.11 | 8.33 | 2 | 0.116 | 0.039 | 0.338 | 0.000 | 0.155 |
| 9 | 100 | 11.11 | 8.33 | 2 | 0.233 | 0.039 | 0.423 | 0.000 | 0.271 |
| 10 | 100 | 11.11 | 8.33 | 2 | 0.233 | 0.039 | 0.338 | 0.000 | 0.271 |
| C3 | 100 | 11.11 | 8.33 | 1 | 0.291 | 0.000 | 0.000 | 0.047 | 0.047 |
| C4 | 100 | 11.11 | 8.33 | 2 | 0.291 | 0.000 | 0.000 | 0.047 | 0.047 |
| C5 | 100 | 11.11 | 8.33 | 3 | 0.291 | 0.000 | 0.000 | 0.047 | 0.047 |
| C6 | 100 | 11.11 | 8.33 | 1 | 0.291 | 0.000 | 0.000 | 0.028 | 0.028 |
| C7 | 100 | 11.11 | 8.33 | 2 | 0.291 | 0.000 | 0.000 | 0.028 | 0.028 |
| C8 | 100 | 11.11 | 8.33 | 3 | 0.291 | 0.000 | 0.000 | 0.028 | 0.028 |
| 11 | 100 | 11.11 | 8.33 | 2 | 0.116 | 0.039 | 0.338 | 0.000 | 0.155 |
| 12 | 100 | 11.11 | 8.33 | 2 | 0.233 | 0.039 | 0.423 | 0.000 | 0.271 |
| 13 | 100 | 11.11 | 8.33 | 2 | 0.233 | 0.039 | 0.423 | 0.000 | 0.271 |
| 14 | 100 | 11.11 | 8.33 | 2 | 0.233 | 0.039 | 0.423 | 0.000 | 0.271 |
| 15 | 100 | 11.11 | 8.33 | 2 | 0.233 | 0.039 | 0.338 | 0.000 | 0.271 |
| 16 | 100 | 11.11 | 8.33 | 2 | 0.233 | 0.039 | 0.338 | 0.000 | 0.271 |
| 17 | 100 | 11.11 | 8.33 | 2 | 0.233 | 0.039 | 0.338 | 0.000 | 0.271 |

The performance of the tapes made for each of the examples is summarized in Table 6.

TABLE 6

| Example | Peel Adhesion N/m @432 mm/min | Peel Adhesion N/m @7.6 mm/min | Peel Creep min @70 C., 40 g | Peel Creep min @70 C., 100 g | Shear min @ 70 C. |
|---|---|---|---|---|---|
| 1 | 458 | 202 | 15 | | 9700 |
| 2 | 646 | 230 | 60 | | 7546 |
| 3 | 446 | 180 | 100 | | 6815 |
| C1 | 628 | 76 | 12 | | 1678 |
| C2 | 616 | 76 | 11 | | 450 |
| 4 | 588 | 296 | >168 | | >10000 |
| 5 | 684 | 492 | >168 | | >10000 |
| 6 | 596 | 490 | >168 | | >10000 |
| 7 | 564 | 328 | 1440 | | 2130 |
| 8 | 732 | 478 | >2000 | | >10000 |
| 9 | 772 | 514 | >2000 | | >10000 |
| 10 | 712 | 492 | | 1845 | >10000 |
| C3 | 882 | 400 | 210 | | 1438 |
| C4 | 848 | 484 | 1440 | | 267 |
| C5 | 962 | 106 | 60 | | 4 |
| C6 | 750 | 464 | 1200 | | 1018 |
| C7 | 876 | 376 | 2160 | | 103 |
| C8 | 880 | 170 | 210 | | 9 |

TABLE 6-continued

| Example | Peel Adhesion N/m @432 mm/min | Peel Adhesion N/m @7.6 mm/min | Peel Creep min @70 C., 40 g | Peel Creep min @70 C., 100 g | Shear min @ 70 C. |
|---|---|---|---|---|---|
| 11 | 504 | 372 | 1008 | | >10000 |
| 12 | 634 | 416 | 3411 | | >10000 |
| 13 | 612 | 394 | 560 | | >10000 |
| 14 | 744 | 504 | | 223 | >10000 |
| 15 | 788 | 624 | | 2120 | >10000 |
| 16 | 776 | 564 | | 259 | >10000 |
| 17 | 820 | 630 | | 446 | >10000 |

This specification provides the following embodiments:
1. A process for preparing a melt-processible adhesive comprising:
   a) dissolving a high $T_g$ copolymer having a $M_w$>30 kD comprising:
      i. high $T_g$ (meth)acrylic acid ester monomer units;
      ii) optional acid functional ethylenically unsaturated monomer units;
      iii) optional low $T_g$ (meth)acrylic acid ester monomer units;
      iv) optional non-acid functional, ethylenically unsaturated polar monomer units;
      v) optional vinyl monomer units; wherein the sum of i) to v) is 100 parts by weight;
   in a monomer mixture for a low $T_g$ copolymer comprising
      i. low $T_g$ (meth)acrylic acid ester monomers;
      ii. optional acid functional ethylenically unsaturated monomers;
      iii. optionally non-acid functional, ethylenically unsaturated polar monomers;
      iv. optionally vinyl monomers; wherein the sum of i) to iv) is 100 parts by weight;
   said mixture optionally including a hydrogenated hydrocarbon tackifier,
   b) polymerizing the resultant mixture;
   c) adding hydrogenated hydrocarbon tackifier if not present in step a);
   d) melt extruding the polymerized mixture; and
   e) crosslinking the extrudate by electron beam irradiation.
2. The process of embodiment 1 wherein the tackifier is present in step a).
3. The process of embodiment 1 wherein the tackifier is added in step c).
4. The process of any of the previous embodiments wherein the non-acid-functional polar monomers are base functional polar monomers.
5. The process of embodiment 4 wherein the base-functional monomers are amide-functional monomers.
6. The process of any of the previous embodiments wherein said high $T_g$ copolymer comprises acid functional monomer units, and the monomer mixture for the low $T_g$ copolymer component comprises base-functional, monomer units and the adhesive comprises a minimum of 0.05 moles of acid/base pairs per kilogram of the composition.
7. The process of embodiment 6 wherein said high $T_g$ copolymer comprises less than 0.5 parts by weight of basic monomers units, and the monomer mixture for the low $T_g$ copolymer component the adhesive comprises less than 0.5 parts by weight of acid-functional monomers units.
8. The process of embodiment 4 wherein said low $T_g$ copolymer comprises acid functional monomer units, and the high $T_g$ copolymer component comprises base-functional monomer units and comprises a minimum of 0.05 moles of acid/base pairs per kilogram of the composition.
9. The process of embodiment 8 wherein said low $T_g$ copolymer comprises less than 0.5 parts by weight of basic monomers units, and the $T_g$ copolymer component comprises less than 0.5 parts by weight of acid-functional monomers units.
10. The process of any of the previous embodiments comprising 0.1 to 20 parts by weight of a hydrogenated hydrocarbon tackifier, based on 100 parts by weight of the low $T_g$ monomer mixture and high $T_g$ copolymer.
11. The process of any of the previous embodiments comprising up to 40 parts by weight of a high $T_g$ acrylate copolymer and 60 parts by weight or greater of a low $T_g$ monomer mixture based on 100 parts by weight of the low $T_g$ monomer mixture and the high $T_g$ copolymer.
12. The process of any of the previous embodiments wherein the high $T_g$ (meth)acrylate copolymer has a $T_g$ of >50° C.
13. The process of any of the previous embodiments wherein the low $T_g$ monomer mixture comprises:
   i. 85 to 99.5 parts by weight of an (meth)acrylic acid ester monomers;
   ii. 0.5 to 15 parts by weight of an acid-functional ethylenically unsaturated monomers;
   iii. 1 to 10 parts by weight of a non-acid functional, ethylenically unsaturated polar monomers; and
   iv. 0 to 5 parts vinyl monomer; wherein the sum of i) to iv) is 100 parts by weight.
14. The process of embodiment 13 wherein the non-acid functional, ethylenically unsaturated polar monomers are base-functional monomers, and the molar amount thereof exceeds the molar amount or the acid-functional monomer.
15. The process of any of the previous embodiments wherein the high $T_g$ copolymer comprises:
   i) up to 100 parts by weight of high $T_g$ (meth)acrylic acid ester monomer units;
   ii) 0 to 15, preferably 1 to 10 parts by weight of acid functional ethylenically unsaturated monomer units;
   iii) 0 to 50 parts by weight of optional low $T_g$ (meth)acrylic acid ester monomer units;
   iv) 0 to 15, preferably 1 to 10 parts by weight of optional a non-acid functional, ethylenically unsaturated polar monomer units; and
   v) 0 to 5, preferably 1 to 5 parts by weight of optional vinyl monomer units; wherein the sum of i) to v) is 100 parts by weight.
16. The process of embodiment 15 wherein the non-acid functional, ethylenically unsaturated polar monomers are base-functional monomers, and the molar amount thereof is less than the molar amount of the acid-functional monomer.
17. The process of any of the previous embodiments wherein the polymerized mixture is coextruded with a backing.
18. The process of embodiment 17 wherein the polymerized mixture is coextruded with a foam backing.
19. The process of any of the previous embodiments wherein the high $T_g$ copolymer is prepared by an adiabatic batch polymerization process.
20. The process of any of the previous embodiments wherein the step b) of polymerization is photopolymerization.
21. The process of any of the previous embodiments wherein the mixture has a viscosity of from 100 to 10,000 cPs at 22° C. prior to polymerization.
22. The process of any of the previous embodiments wherein the mixture has no crosslinking agents.

23. The process of any of the previous embodiments wherein the polymerized composition is extruded onto a backing.
24. The process of any of the previous embodiments wherein the polymerized composition is extruded onto a foam backing.
25. The process of any of the previous embodiments comprising a minimum of 0.05 moles of acid/base pairs per kilogram of the composition.
26. An electron-beam crosslinked adhesive composition comprising:
   a) a high $T_g$ copolymer having a $M_w$>30 kD comprising:
   i. high $T_g$ (meth)acrylic acid ester monomer units;
   ii) optional acid functional ethylenically unsaturated monomer units;
   iii) optional low $T_g$ (meth)acrylic acid ester monomer units;
   iv) optional non-acid functional, ethylenically unsaturated polar monomer units;
   v) optional vinyl monomer units; wherein the sum of i) to v) is a 100 parts by weight;
   b) a low $T_g$ copolymer comprising
   i. low $T_g$ (meth)acrylic acid ester monomers;
   ii. optional acid functional ethylenically unsaturated monomers;
   iii. optional non-acid functional, ethylenically unsaturated polar monomers;
   iv. optionally vinyl monomers; wherein the sum of i) to iv) is 100 parts by weight; and
   c) a hydrogenated hydrocarbon tackifier.
27. The adhesive composition of embodiment 26 wherein the high $T_g$ copolymer comprises acid-functional monomer units and the low $T_g$ copolymer comprises basic-functional polar monomer units.
28. The adhesive composition of embodiment 26 wherein the low $T_g$ copolymer comprises acid-functional monomer units and the high $T_g$ copolymer comprises basic-functional polar monomer units.
29. The adhesive composition of embodiment 26 wherein the high $T_g$ copolymer is predominantly acidic and the low $T_g$ copolymer is predominately basic.
30. The adhesive composition of embodiment 29 wherein the high $T_g$ copolymer contains 1 to 10 parts by weight of acid functional ethylenically unsaturated monomer units; and less than 0.5 parts by weight of basic monomers, and the low $T_g$ copolymer comprises 1 to 10 parts by weight of a base-functional, ethylenically unsaturated polar monomers and less than 0.5 parts by weight of acidic monomers.
31. The adhesive composition of any of embodiments 26-30 containing no crosslinking agents.
32. The adhesive composition of any of embodiments 26-31 comprising a minimum of 0.05 moles of acid/base pairs per kilogram of the composition.
33. The adhesive composition of any of embodiments 26-32 comprising a minimum of 0.05 moles of acid/base pairs per kilogram of the composition.
34. The adhesive composition any of embodiments 26-33 wherein the composition is prepared by combining the high $T_g$ copolymer, a monomer mixture for the low $T_g$ copolymer, polymerizing the mixture, adding the tackifier in a melt mixing step, melt extruding the mixture, and crosslinking by electron beam.
35. The adhesive composition any of embodiments 26-34 comprising a minimum of 0.05 moles of acid/base pairs per kilogram of the composition.
36. A process for preparing a melt-processable adhesive comprising:
   a) combining a high $T_g$ copolymer having a $M_w$>30 kD comprising:
   i. high $T_g$ (meth)acrylic acid ester monomer units;
   ii) optional acid functional ethylenically unsaturated monomer units;
   iii) optional low $T_g$ (meth)acrylic acid ester monomer units;
   iv) optional non-acid functional, ethylenically unsaturated polar monomer units;
   v) optional vinyl monomer units; wherein the sum of i) to v) is 100 parts by weight; with
   a low $T_g$ copolymer comprising:
   i. low $T_g$ (meth)acrylic acid ester monomers;
   ii. optional acid functional ethylenically unsaturated monomers;
   iii. optionally non-acid functional, ethylenically unsaturated polar monomers;
   iv. optionally vinyl monomers; wherein the sum of i) to iv) is 100 parts by weight;
   and
   a hydrogenated hydrocarbon tackifier,
   b) melt extruding the polymerized mixture; and
   c) crosslinking the extrudate by electron beam irradiation.
37. The adhesive composition of embodiment 36 comprising a minimum of 0.05 moles of acid/base pairs per kilogram of the composition.
38. An crosslinked adhesive composition comprising:
   a) a high $T_g$ copolymer having a $M_w$>30 kD comprising:
   i. high $T_g$ (meth)acrylic acid ester monomer units;
   ii) optional acid functional ethylenically unsaturated monomer units;
   iii) optional low $T_g$ (meth)acrylic acid ester monomer units;
   iv) optional non-acid functional, ethylenically unsaturated polar monomer units;
   v) optional vinyl monomer units; wherein the sum of i) to v) is 100 parts by weight;
   b) a low $T_g$ copolymer comprising
   i. low $T_g$ (meth)acrylic acid ester monomers;
   ii. optional acid functional ethylenically unsaturated monomers;
   iii. optional non-acid functional, ethylenically unsaturated polar monomers;
   iv. optionally vinyl monomers; wherein the sum of i) to iv) is 100 parts by weight; and
   c) a hydrogenated hydrocarbon tackifier, wherein the composition comprises a minimum of 0.05 moles of acid/base pairs per kilogram of the composition.
39. The adhesive composition of embodiment 38 wherein the high $T_g$ copolymer comprises acid-functional monomer units and the low $T_g$ copolymer comprises basic-functional monomer units.
40. The adhesive composition of embodiment 38 wherein the low $T_g$ copolymer comprises acid-functional monomer units and the high $T_g$ copolymer comprises basic-functional monomer units.
41. The crosslinked adhesive composition any of embodiments 38-40, crosslinked by electron beam.
42. The adhesive composition of embodiment 38 wherein the high $T_g$ copolymer is predominantly acidic and the low $T_g$ copolymer is predominately basic.
43. The adhesive composition of embodiment 42 wherein the high $T_g$ copolymer contains less than 0.5 parts by weight of basic monomers and the low $T_g$ copolymer comprises less than 0.5 parts by weight of acidic monomers.

44. The adhesive composition of any of embodiment 38-43 wherein the composition is prepared by combining the high $T_g$ copolymer, a monomer mixture for the low $T_g$ copolymer, polymerizing the mixture, adding the tackifier in a melt mixing step, melt extruding the mixture, and crosslinking by electron beam.

45. A process for preparing a melt-processible adhesive comprising:
   a) dissolving a high $T_g$ copolymer having a $M_w$>30 kD comprising:
      i. high $T_g$ (meth)acrylic acid ester monomer units;
      ii) optional acid functional ethylenically unsaturated monomer units;
      iii) optional low $T_g$ (meth)acrylic acid ester monomer units;
      iv) optional non-acid functional, ethylenically unsaturated polar monomer units;
      v) optional vinyl monomer units; wherein the sum of i) to v) is 100 parts by weight;
   in a monomer mixture for a low $T_g$ copolymer comprising
      i. low $T_g$ (meth)acrylic acid ester monomers;
      ii. acid functional ethylenically unsaturated monomers;
      iii. optionally non-acid functional, ethylenically unsaturated polar monomers;
      iv. optionally vinyl monomers; wherein the sum of i) to iv) is 100 parts by weight;
   said mixture optionally including a hydrogenated hydrocarbon tackifier,
   b) polymerizing the resultant mixture;
   c) adding hydrogenated hydrocarbon tackifier if not present in step a);
   d) melt extruding the polymerized mixture; and
   e) crosslinking the extrudate, wherein the composition comprises a minimum of 0.05 moles of acid/base pairs per kilogram of the composition.

46. The process of embodiment 45 wherein the adhesive is crosslinked by electron beam.
47. The process of embodiment 45 wherein the tackifier is present in step a).
48. The process of embodiment 45 wherein the tackifier is added in step c).
49. The process of any of embodiments 45-48 wherein the non-acid-functional polar monomers are base functional polar monomers.
50. The process of embodiment 49 wherein the base-functional monomers are amide-functional monomers.
51. The process of any of embodiments 45-50 wherein said high $T_g$ copolymer comprises acid functional monomer units and less than 0.5 parts by weight of basic monomers units, and the monomer mixture for the low $T_g$ copolymer component comprises base-functional, monomer units and less than 0.5 parts by weight of acid-functional monomers units.
52. The process of any of embodiments 45-51 wherein the adhesive comprises a minimum of 0.05 moles of acid/base pairs per kilogram of the composition.
53. The process of any of embodiments 45-52 comprising 0.1 to 20 parts by weight of a hydrogenated hydrocarbon tackifier, based on 100 parts by weight of the low $T_g$ monomer mixture and high $T_g$ copolymer.
54. The process of any of embodiments 45-53 comprising up to 40 parts by weight of a high $T_g$ acrylate copolymer and 60 parts by weight or greater of a low $T_g$ monomer mixture.
55. The process of any of embodiments 45-54 wherein the high $T_g$ (meth)acrylate copolymer has a $T_g$ of >50° C.
56. The process of embodiment 45 wherein the low $T_g$ monomer mixture comprises:
   i. 85 to 99.5 parts by weight of an (meth)acrylic acid ester monomers;
   ii. 0 to 15, preferably 1 to 10 parts by weight of an acid-functional ethylenically unsaturated monomers;
   iii. 0 to 15, preferably 1 to 10 parts by weight of a non-acid functional, ethylenically unsaturated polar monomers; and
   iv. 0 to 5 parts vinyl monomer wherein the sum of i) to iv) is 100 parts by weight.
57. The process of any of embodiments 45-56 wherein the non-acid functional, ethylenically unsaturated polar monomers are base-functional monomers, and the molar amount thereof exceeds the molar amount or the acid-functional monomer.
58. The process of embodiment 45 wherein the high $T_g$ copolymer comprises:
   i) up to 100 parts by weight of high $T_g$ (meth)acrylic acid ester monomer units;
   ii) 0 to 15 parts by weight of acid functional ethylenically unsaturated monomer units;
   iii) 0 to 50 parts by weight of optional low $T_g$ (meth)acrylic acid ester monomer units;
   iv) 0 to 15, preferably 1 to 5 parts by weight of optional a non-acid functional, ethylenically unsaturated polar monomer units; and
   v) 0 to 5, preferably 1 to 5 parts by weight of optional vinyl monomer unit;
   wherein the sum of i) to v) is 100 parts by weight.
59. The process of embodiment 57 wherein the non-acid functional, ethylenically unsaturated polar monomers are base-functional monomers, and the molar amount thereof is less than the molar amount of the acid-functional monomer.
60. The process of any of embodiments 45-59 wherein the polymerized mixture is coextruded with a backing.
61. The process of any of embodiments 45-60 wherein the polymerized mixture is coextruded with a foam backing.
62. The process of any of embodiments 45-61 wherein the high $T_g$ copolymer is prepared by an adiabatic batch polymerization process.
63. The process of any of embodiments 45-62 wherein the step b) of polymerization is photopolymerization.
64. The process of any of embodiments 45-63 wherein the mixture has a viscosity of from 100 to 10,000 cPs at 22° C. prior to polymerization.
65. An adhesive article comprising a crosslinked adhesive layer of any of embodiments 38-44 comprising a high- and low-$T_g$ copolymers, and a hydrogenated hydrocarbon tackifier on a backing layer.
66. The adhesive article of embodiment 65 wherein the backing layer is a foam backing layer.
67. The adhesive article of embodiment 66 comprising two adhesive layers disposed on opposite surfaces of the backing.
68. The adhesive article of any of embodiments 65-67, further comprising at least one release liner.

What is claimed is:
1. A process for preparing a melt-processible adhesive comprising:
   a) dissolving a high $T_g$ copolymer having a Mw>30 kD comprising:
      i) up to 100 parts by weight of high $T_g$ (meth)acrylic acid ester monomer units;
      ii) 1 to 10 parts by weight of acid functional ethylenically unsaturated monomer units;

iii) 0 to 50 parts by weight of optional low $T_g$ (meth) acrylic acid ester monomer units;
iv) 1 to 10 parts by weight of non-acid functional, ethylenically unsaturated polar monomer units;
v) 0 to 5 parts by weight of vinyl monomer units;
wherein the sum of i) to v) is 100 parts by weight; and
wherein monomer units i) to v) are distinct monomer units;
in a monomer mixture for a low $T_g$ copolymer comprising
   i. 85 to 99.5 parts by weight of low $T_g$ (meth)acrylic acid ester monomers;
   ii. 0.5 to 15 parts by weight of acid functional ethylenically unsaturated monomers;
   iii. 1 to 10 parts by weight of non-acid functional, ethylenically unsaturated polar monomers;
   iv. 0 to 5 parts of vinyl monomers; wherein the sum of i) to iv) is 100 parts by weight; and
   wherein monomer units i) to iv) are distinct monomer units;
   said mixture optionally including a hydrogenated hydrocarbon tackifier;
b) polymerizing the resultant mixture;
c) adding hydrogenated hydrocarbon tackifier if not present in step a);
d) melt extruding the polymerized mixture to form an extrudate; and
e) crosslinking the extrudate by electron beam irradiation;
wherein the adhesive comprises a minimum of 0.05 moles of acid/base pairs per kilogram of the composition and comprising 0.1 to 20 parts by weight of a hydrogenated hydrocarbon tackifier, based on 100 parts by weight of the low $T_g$ monomer mixture and high $T_g$ copolymer.

2. The process of claim 1, step a), comprising up to 40 parts by weight of the high $T_g$ copolymer and 60 parts by weight or greater of a low $T_g$ monomer mixture based on 100 parts by weight of the low $T_g$ monomer mixture and the high $T_g$ copolymer.

3. The process of claim 1, step a), wherein the non-acid functional, ethylenically unsaturated polar monomers of the high $T_g$ copolymer are base-functional monomers, and the molar amount thereof is less than the molar amount of the acid-functional monomer.

4. An electron-beam crosslinked adhesive composition comprising:
a) a high $T_g$ copolymer having a Mw>30 kD comprising:
   i) up to 100 parts by weight of high $T_g$ (meth)acrylic acid ester monomer units;
   ii) 1 to 10 parts by weight of acid functional ethylenically unsaturated monomer units;
   iii) 0 to 50 parts by weight of optional low $T_g$ (meth) acrylic acid ester monomer units;
   iv) 1 to 10 parts by weight of non-acid functional, ethylenically unsaturated polar monomer units;
   v) 0 to 5 parts by weight of vinyl monomer units;
   wherein the sum of i) to v) is 100 parts by weight; and
   wherein monomer units i) to v) are distinct monomer units;
b) a low $T_g$ copolymer comprising
   i. 85 to 99.5 parts by weight of low $T_g$ (meth)acrylic acid ester monomers;
   ii. 0.5 to 15 parts by weight of acid functional ethylenically unsaturated monomers;
   iii. 1 to 10 parts by weight of non-acid functional, ethylenically unsaturated polar monomers;
   iv. 0 to 5 parts of vinyl monomers; wherein the sum of i) to iv) is 100 parts by weight; and
   wherein monomer units i) to iv) are distinct monomer units; and
c) 0.1 to 20 parts by weight of a hydrogenated hydrocarbon tackifier, based on 100 parts by weight of the low $T_g$ monomer mixture and high $T_g$ copolymer a hydrogenated hydrocarbon tackifier;
wherein the adhesive comprises a minimum of 0.05 moles of acid/base pairs per kilogram of the composition.

5. The adhesive composition of claim 4 containing no crosslinking agents.

* * * * *

UNITED STATES PATENT AND TRADEMARK OFFICE
CERTIFICATE OF CORRECTION

Page 1 of 2

PATENT NO. : 10,208,232 B2
APPLICATION NO. : 14/888949
DATED : February 19, 2019
INVENTOR(S) : Wang et al.

It is certified that error appears in the above-identified patent and that said Letters Patent is hereby corrected as shown below:

On the Title Page

Item (56), Column 2 (Other Publications)
Line 14 (approx.), below "3 pages." delete "(Continued)".

In the Specification

Column 7
Line 16, delete "3-heptanal," and insert -- 3-heptanol, --, therefor.
Line 17, delete "2-1-decanol," and insert -- 2-ethyl-1-hexanol, 1-decanol, --, therefor.

Column 8
Line 28, delete "(DMAEA);" and insert -- (DMAPA); --, therefor.

Column 12
Line 9, delete "min" and insert -- mm --, therefor.

Column 16
Line 63, after "irradiation" insert -- . --.

Column 17
Line 3, delete "polyethylene" and insert -- poly(ethylene --, therefor.
Line 8, delete "trialkoxysilane" and insert -- trialkoxy silane --, therefor.

Column 20
Line 50, delete "coextxuded" and insert -- coextruded --, therefor.

Column 21
Line 24, delete "MASS" and insert -- IMASS --, therefor.

Signed and Sealed this
Fifth Day of November, 2019

Andrei Iancu
*Director of the United States Patent and Trademark Office*

Column 24
Line 19 (approx.), delete ".the" and insert -- , the --, therefor.
Line 39, after "1 kg" insert -- . --.

Column 30
Line 22, delete "tackifier," and insert -- tackifier; --, therefor.